(12) United States Patent
Ball et al.

(10) Patent No.: US 6,226,424 B1
(45) Date of Patent: May 1, 2001

(54) INTEGRATED WAVELENGTH-SELECT TRANSMITTER

(75) Inventors: Gary A. Ball, Simsbury, CT (US); Robert W. Ade, Boca Raton, FL (US); Karl Kissa, Simsbury, CT (US); Paul Dunn, Westfield, MA (US); Timothy C. Munks, Crystal Lake, IL (US); Ronald T. Logan, Jr., Newtown; Eitan Gertel, North Wales, both of PA (US)

(73) Assignee: Uniphase Telecommunications Products, Inc., Bloomfield, CT (US)

( * ) Notice: Subject to any disclaimer, the term of this patent is extended or adjusted under 35 U.S.C. 154(b) by 0 days.

(21) Appl. No.: 09/306,108

(22) Filed: May 6, 1999

Related U.S. Application Data

(63) Continuation-in-part of application No. 08/934,189, filed on Sep. 19, 1997.

(51) Int. Cl.[7] .................................................. G02B 6/12
(52) U.S. Cl. ................................................................ 385/14
(58) Field of Search .................................... 385/111, 147; 369/215, 244, 44.14, 44.37; 356/345, 357, 359

(56) References Cited

U.S. PATENT DOCUMENTS

| | | |
|---|---|---|
| 4,284,663 | 8/1981 | Carruthers et al. . |
| 4,773,075 | 9/1988 | Akiba et al. ............................. 372/50 |
| 4,815,081 | 3/1989 | Mahlein et al. ........................ 372/32 |
| 4,913,525 | 4/1990 | Asakura et al. ................. 350/162.12 |
| 4,953,939 | 9/1990 | Epworth et al. . |

(List continued on next page.)

FOREIGN PATENT DOCUMENTS

| | | |
|---|---|---|
| 0 444 610 A2 | 3/1990 | (EP) . |
| 0 450 385 A1 | 3/1990 | (EP) . |
| 0 444 610 A2 | 9/1991 | (EP) . |
| 0 450 385 A1 | 10/1991 | (EP) . |
| 0 516 318 A2 | 12/1992 | (EP) . |

(List continued on next page.)

OTHER PUBLICATIONS

"Properties of Loss–Coupled Distributed Feedback Laser Arrays for Wavelength Division Multiplexing Systems", by Stefan Hansmann, et al., *Journal of Lightwave Technology*, vol. 15, No. 7 (Jul. 1997).

"Single–Angled–Facet Laser Diode for Widely Tunable External Cavity Semiconductor Lasers with High Spectral Purity", by P.J.S. Heim, et al., *Electronics Letters*, vol. 33, No. 16 (Jul. 31, 1997).

(List continued on next page.)

*Primary Examiner*—Akm E. Ullah
(74) *Attorney, Agent, or Firm*—McCormick, Paulding & Huber LLP

(57) ABSTRACT

An integrated optical transmitter for use in an optical system includes an optical head assembly having an optical beam generator for providing an optical beam and a lens assembly for collecting the optical beam and generating therefrom a formed optical beam. Interface optics receive the formed optical beam for coupling the beam to a modulator so as to reduce nsertion loss to the optical beam. The optical modulator receives the optical beam from the interface optics and provides a modulated optical beam in response to received modulation signals. The optical modulator is coupled to the interface optics to be in a fixed relationship therewith. The integrated optical transmitter can include a means for sampling the optical beam and controlling the temperature of and/or the current supplied to the optical beam generator for controlling the wavelength of the optical transmitter. The optical head assembly and the modulator can be compliantly mounted to a mounting surface reducing the effects of thermal stress on the performance of the optical transmitter.

29 Claims, 13 Drawing Sheets

U.S. PATENT DOCUMENTS

| | | | |
|---|---|---|---|
| 4,984,861 | 1/1991 | Suchowski et al. . | |
| 5,011,247 | 4/1991 | Boudreau et al. | 350/96.2 |
| 5,018,820 | 5/1991 | Boudreau et al. | 350/96.2 |
| 5,026,137 | 6/1991 | Tokumitsu . | |
| 5,068,864 | 11/1991 | Javan | 372/32 |
| 5,082,376 | 1/1992 | Beylat et al. | 385/3 |
| 5,107,360 | 4/1992 | Huber . | |
| 5,115,338 | 5/1992 | DiGiovanni et al. . | |
| 5,119,447 | 6/1992 | Trisno . | |
| 5,127,072 | 6/1992 | Blauvelt et al. | 385/88 |
| 5,134,620 | 7/1992 | Huber . | |
| 5,140,456 | 8/1992 | Huber . | |
| 5,148,503 | 9/1992 | Skeie . | |
| 5,151,908 | 9/1992 | Huber . | |
| 5,153,762 | 10/1992 | Huber . | |
| 5,159,601 | 10/1992 | Huber . | |
| 5,166,821 | 11/1992 | Huber . | |
| 5,168,534 | 12/1992 | McBrien et al. . | |
| 5,187,760 | 2/1993 | Huber . | |
| 5,191,586 | 3/1993 | Huber . | |
| 5,200,964 | 4/1993 | Huber . | |
| 5,208,819 | 5/1993 | Huber | 372/32 |
| 5,210,631 | 5/1993 | Huber et al. . | |
| 5,210,633 | 5/1993 | Trisno . | |
| 5,222,089 | 6/1993 | Huber . | |
| 5,231,529 | 7/1993 | Kaede . | |
| 5,243,609 | 9/1993 | Huber . | |
| 5,257,124 | 10/1993 | Glaab et al. . | |
| 5,257,125 | 10/1993 | Maeda . | |
| 5,260,823 | 11/1993 | Payne et al. . | |
| 5,268,910 | 12/1993 | Huber . | |
| 5,271,024 | 12/1993 | Huber . | |
| 5,283,686 | 2/1994 | Huber . | |
| 5,287,367 | 2/1994 | Yanagawa | 372/31 |
| 5,299,212 | 3/1994 | Koch et al. | 372/32 |
| 5,323,409 | 6/1994 | Laskoskie et al. | 372/32 |
| 5,428,700 | 6/1995 | Hall | 372/32 |
| 5,544,183 | 8/1996 | Takeda | 372/38 |
| 5,579,143 | 11/1996 | Huber . | |
| 5,608,825 | 3/1997 | Ip . | |
| 5,627,848 | 5/1997 | Fermann et al. . | |
| 5,633,748 | 5/1997 | Perez et al. . | |
| 5,636,301 | 6/1997 | O'Sullivan et al. . | |
| 5,638,473 | 6/1997 | Byron . | |
| 5,642,448 | 6/1997 | Pan et al. | 385/31 |
| 5,691,989 | 11/1997 | Rakuljic et al. | 372/20 |
| 5,706,301 | 1/1998 | Lagerstrom | 372/32 |
| 5,780,843 | 7/1998 | Cliche et al. | 250/226 |
| 5,798,859 | 8/1998 | Colbourne et al. | 359/247 |
| 5,815,482 * | 4/2000 | Rope et al. | 369/112 |
| 5,818,592 * | 10/1998 | Womack et al. | 356/244 |
| 5,825,792 | 10/1998 | Villeneuve et al. | 372/32 |
| 5,867,513 | 2/1999 | Sato | 372/32 |
| 5,920,539 * | 7/1999 | Schell et al. | 369/244 |
| 6,052,357 * | 4/2000 | Ogawa et al. | 369/215 |

FOREIGN PATENT DOCUMENTS

| | | |
|---|---|---|
| 0 516 318 A3 | 12/1992 | (EP) . |
| 2 295 247 | 11/1996 | (GB) . |
| 0 305 5709 | 2/1991 | (JP) . |
| 0 427 4204 A1 | 9/1992 | (JP) . |
| WO 97/05679 | 2/1997 | (WO) . |
| WO 97/07577 | 2/1997 | (WO) . |
| WO 98/50988 | 5/1998 | (WO) . |
| WO 99/04466 | 1/1999 | (WO) . |
| WO 99/08349 | 2/1999 | (WO) . |

OTHER PUBLICATIONS

"Monolithic Mode–Locked Semiconductor Laser for Continuously Tunable Millimeter–Wave Transmission", by Dennis T.K. Tong, et al., *SPIE*, vol. 3038.

"2.5 Gbit/s Directly–Modulated Fibre Grating Laser for WDM Networks", by F.N. Timofeev, et al., *Electronics Letters*, vol. 33, No. 16 (Jul. 31, 1997).

"2.5 Gbit/s Directly–Modulated Fibre Grating Laser for Optical Networks", by F.N. Timofeev, et al., *The Institution of Electrical Engineers*, 1997.

"Visible Laser Sources Based on Frequency Doubling in Nonlinear Waveguides", by Jonas Webjorn, et al., *IEEE*, 1997.

"Experimental Demonstration of an All–Optical Routing Node for Multihop Wavelength Routed Networks", by M. Shell, et al., *IEEE*, 1996.

"Continuously Chirped DFB Gratings by Specially Bent Waveguides for Tunable Lasers", by Hartmut Hillmer, et al., *Journal of Lightwave Technology*, vol. 13, No. 9 (Sep. 1995).

"Optical Frequency Switching with SSG–DBR Structured Devices", by Hiroshi Yasaka, et al., *NTT Opto–Electronics Laboratories* (1995).

"Wavelength Tuning in Three Section Sampled Grating DBR Lasers", C.K. Gardiner, et al., *Electronics Letters*, vol. 31, No. 15 (Jul. 20, 1995).

"A 2.5–Gbit/s Return–to–Zero Integrated DBR Laser/Modulator Transmitter", by G. Raybon, et al., *IEEE Photonics Technology Letters*, vol. 6, No. 11 (Nov. 1994).

"Tunable Lasers for Photonic Integrated Circuits", by L.A. Coldren, et al., *LEOS Summer Topical Meeting Integrated Optoeelectronics Proceedings of the LEOS 1994 Summer Topical Meeting* (Jul. 6–8, 1994).

"High Bandwidth Polymer Modulators", by Datong Chen, et al., *IEEE* (1997).

* cited by examiner

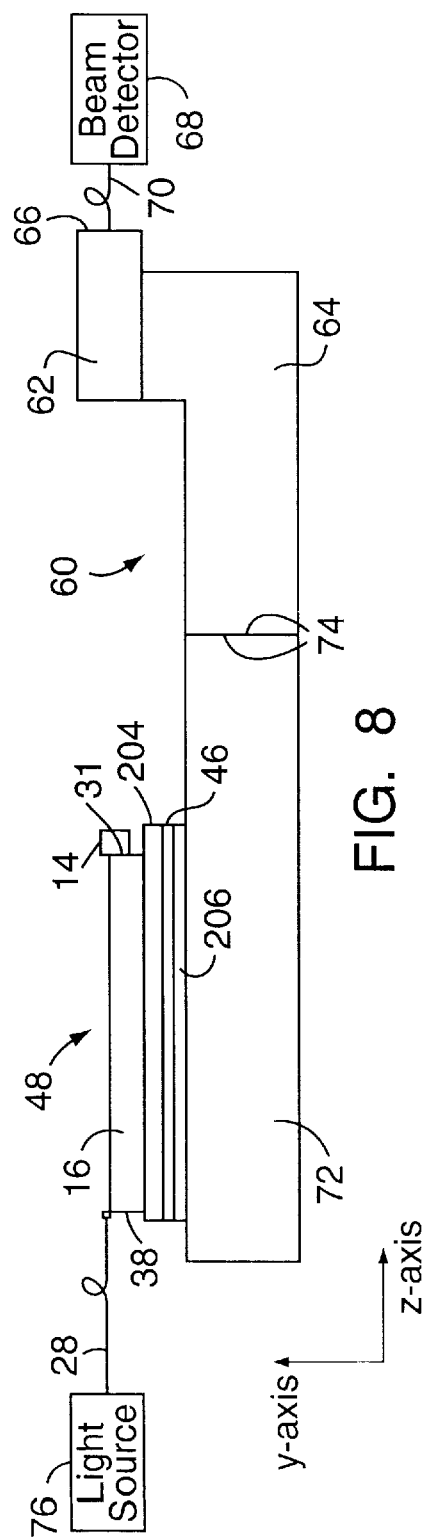
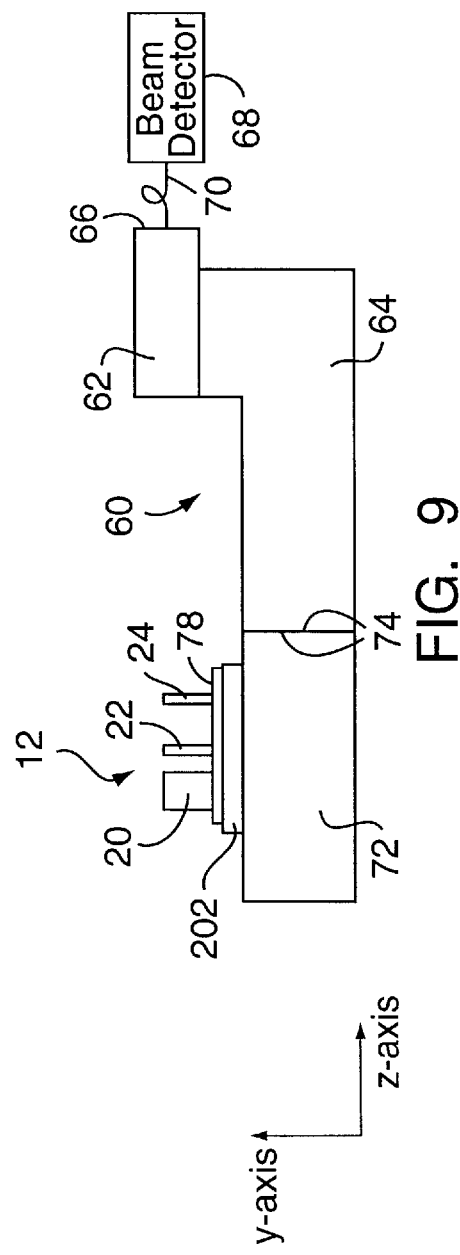
FIG. 8
FIG. 9

INTEGRATED WAVELENGTH-SELECT TRANSMITTER

CROSS REFERENCE TO RELATED APPLICATIONS

This application is a continuation-in-part of U.S. patent application Ser. No. 08/934,189 filed Sep. 19, 1997 entitled "Integrated Wavelength-Select Transmitter," now pending and herein incorporated by reference. Some of the matter contained herein is disclosed and claimed in the commonly-owned U.S. Patent Application entitled "Method and Apparatus For Monitoring And Control of Laser Emission Wavelength," Ser. No. 09/025,987 now allowed, herein incorporated by reference, and in a continuation-in-part of that Application, of the same title, attorney Docket Number 4827-18-1, also herein incorporated by reference.

FIELD OF THE INVENTION

This invention relates to optical transmitters, and more particularly to an optical transmitter that includes a laser, optical modulator, and optionally, wavelength stabilization elements.

BACKGROUND OF THE INVENTION

In a typical optical communication system, an optical transmitter generates an optical beam and modulates the beam with an electrical signal representative of the information to be transmitted by the communication system. Typically, an optical fiber propagates the modulated optical signal to a receiver that demodulates the optical beam to recover the electrical signal. The low loss, light weight, small size, flexibility and high intrinsic bandwidth of optical fiber make optical communication systems highly desirable for the communication of both of digital and analog signals.

There are many current and potential applications for optical communication systems, including cable TV (CATV) systems and telephone and other cross-country or cross-continent communication systems. One important application includes microwave or RF systems, typically used by the military, such as phased-array antenna systems, airborne radar warning-receiver direction-finding antenna systems, bi-static radar antenna systems, and many shipboard antenna systems. In most of these systems, a downconverter/upconverter is located in close proximity to the antenna so as to avoid the high losses associated with transmitting the microwave signals over inefficient metallic cables to the receiver or transmitter. The frequency converter operates in the typically harsh environment of the antenna, which increases the size and cost of the "front end" packaging of the downconverters/upconverters, and may limit placement of the antenna. Also, downconversion typically requires that a local-oscillator reference signal be distributed to the downconverter, again in the harsh environment of the antenna.

Accordingly, systems in which an RF or microwave signal is received or transmitted can benefit from direct microwave transport of the signal via an optical communication system between the antenna and the receiver/transmitter. Benefits can include removal of the frequency converter electronics from the "front end," a corresponding reduction in the size and complexity of the front end packaging, and improvements in overall system reliability, as fewer components are located in the harsh front end environment. The overall performance of the system can also be enhanced, as locating the frequency converter electronics at the front end typically limits the dynamic range of the system.

Unfortunately, the limitations of available optical transmitters can restrict the use of optical communication systems in RF, microwave and other systems. Available optical transmitters typically include a plurality of discrete components such as a laser, an external optical modulator and one or more control circuit modules interconnected by polarization-maintaining (PM) optical fiber. Currently, the optical transmitter is assembled from components that are housed in separate packages, namely, a standard DFB laser diode package and a modulator package, with possibly an optical tap coupler and wavelength reference in two other packages. Significant coupling losses are incurred at the laser-fiber and modulator-fiber interfaces, because lasers and modulators support elliptic modes while fiber medium supports a circular mode. The use of polarization maintaining fiber, such as on the fiber pigtails on the laser and modulator, adds cost because the fiber must be precisely rotated.

Other commercially-available optical transmitters include a laser assembly fixedly coupled to an optical modulator, both of which are rigidly mounted to a support bed. The optical components are fixedly coupled in an attempt to ensure precise alignment thereof, so as to reduce the power loss that can otherwise result from misaligned optics. Alignment of the optical components of these transmitters is difficult and time-consuming, increasing the costs of manufacturing.

Typically, these optical transmitters are sensitive to thermal changes as a result of the different coefficients of thermal expansion for the optical components. As the ambient temperature of the transmitter increases or decreases, unequal thermal expansion of the components creates stresses on the components and can alter their optical characteristics. Optical alignment of the optical components can also be affected. Because the optical beam emitted from the laser diode is typically directly focused to the modulator, misalignment is particularly detrimental, greatly reducing the output power of the transmitter as a result of the misalignment. Some prior art devices, such as those marketed by the G.E.C. Marconi company, are comprised of discrete components and include a thermocooler to help maintain temperature stability. However, these devices are not free from the aforementioned problems.

Furthermore, the optical components of existing optical transmitters are typically not readily replaceable or interchangeable. If a component has failed or it is desired to change the wavelength of the optical beam, the appropriate component cannot be easily removed or replaced without damage to the transmitter.

Additionally, a fiber-optic transmitter including these discrete components is relatively bulky and complicated. For example, currently available fiber optic transmitters produced for cable television (CATV) applications occupy a 19-inch rack drawer chassis, 3 inches or more high, housing power supplies, control circuits, laser, modulator, and amplifiers. As can be appreciated, such a transmitter may not be suitable for implementation at the front end of an antenna system.

The above concerns are especially relevant in Dense Wavelength Division Multiplexed (DWDM) systems, wherein multiple optical beams, each of a different wavelength and representing a distinct channel for the transmission of information, are multiplexed to propagate along a single fiber, thereby increasing the information carrying capacity of the fiber. Each channel typically requires its own optical transmitter, making the size and other limiting considerations of available optical transmitters, as discussed above, even more critical.

Accordingly, it is a principal object of the invention to address one or more of the foregoing disadvantages and deficiencies of the prior art.

SUMMARY OF THE INVENTION

According to the invention, there is provided an integrated optical transmitter that includes an optical head assembly having an optical beam generator for providing an optical beam and a lens assembly collecting the optical beam and generating therefrom a formed optical beam. Also included is an optical modulator for receiving the formed optical beam for providing a modulated optical beam in response to received modulation signals. Interface optics are provided to receive the formed optical beam and to present the formed optical beam to the optical modulator. The interface optics provide optical coupling with the optical modulator to reduce insertion loss to the formed optical beam and to maintain a fixed optical relationship therewith. The optical head assembly and the modulator can be compliantly secured to a mounting surface. The interface optics can include a graded index refractive lens that is fixedly secured to the optical modulator.

The invention can also include provision for stabilizing the wavelength of the optical transmitter. In a preferred embodiment, the optical beam generator is a laser radiating from a first facet for producing the optical beam for provision to the lens assembly. An optical filter receives an optical beam from a second facet and reflects and transmits reflected and transmitted beams to first and second optical detectors. A controller, responsive to detected signals produced by the optical detectors, controls a thermo electric cooler for controlling the temperature, and hence the wavelength of the laser. The operating wavelength of the laser can also be tuned.

According to another aspect of the invention, there is provided a method of controlling the wavelength of light radiated by a semiconductor laser of an optical transmitter. The method includes the steps of providing an optical filter for receiving a light beam from a facet of the laser such that the optical filter reflects a first beam and transmits a second beam; detecting the first beam and second beams providing first and second detected signals, respectively; and comparing the first and second detected signals for generating a feedback signal responsive to the wavelength of the laser for controlling one of the current supplied to the laser and the temperature of the laser responsive to the feedback signal for controlling the wavelength of the light emanated by the laser. The method can include tuning the wavelength of the laser.

According to yet another aspect of the present invention, a method of fabricating an integrated optical transmitter includes the steps of:

(a) aligning optically a laser diode and an aspheric lens;

(b) securing the laser diode and the aspheric lens to a mounting element to define a optical head assembly;

(c) securing fixedly a focusing lens to the optical head assembly in optical alignment with the laser diode and aspheric lens;

(d) compliantly securing the optical head assembly to an optical bed; and (e) securing fixedly an optical modulator to the focusing lens in optical alignment with the focusing lens; and (f) securing the optical modulator to the optical bed.

The invention can also include the step of compliantly securing the modulator to the optical bed.

According to yet another aspect of the present invention, a method of fabricating an integrated optical transmitter of the foregoing type also includes the step of controlling wavelength means of a wavelength filter, such as a Fabry-Perot etalon, fiber Bragg grating, Michelson interferometer, or etalon filter comprised of multi-layer dielectric films, which samples the light in the transmitter, and is included within a housing.

One advantage of the invention is elimination of the optical fiber interconnects between the typical components of an optical transmitter, thereby reducing not only optical losses but the also costs associated with splicing, storing and precisely rotating the fiber within the transmitter.

One important application of the invention is considered to be in communications systems wherein digital signals that include large volumes of voice, video, and other data are transmitted over optical fibers. At the often higher data rates employed by these systems, the transmitter typically includes a Distributed Feedback (DFB) laser and a modulator. In addition, such systems can employ Dense Wavelength Division Multiplexing (DWDM) techniques, where the optical signals from many transmitters, each a different wavelength, are carried by a single optical fiber and separated from one another at the receive end based on the distinct wavelength used for each optical channel.

The above and other objects and advantages of this invention will become more readily apparent when the following description is read in conjunction with the accompanying drawings.

BRIEF DESCRIPTION OF THE DRAWINGS

FIG. 8 is a side elevational view of a GRIN lens/modulator assembly and test jig for aligning the optics of the GRIN lens/modulator assembly of the optical transmitter of FIG. 4.

FIG. 9 is a side elevational view of a optical head assembly and test jig for aligning the optics of the optical head assembly of the optical transmitter of FIG. 4.

DETAILED DESCRIPTION OF THE PREFERRED EMBODIMENTS

An integrated optical transmitter according to the present invention generally includes an optical head assembly for generating a formed optical beam and an optical modulator which receives the formed optical beam for modulation thereof responsive to modulation signals. Interface optics, typically a GRIN lens, optically couples the optical head assembly and the modulator. According to the invention, an optical transmitter is provided wherein the optical head assembly is maintained in fixed optical communication with the optical modulator. This fixed relationship can be maintained in a variety of ways, including an epoxy bond between the components and by spacing the modulator from the optical head assembly. The optical head assembly can be adapted for providing a formed beam that is collimated.

Figure 1:
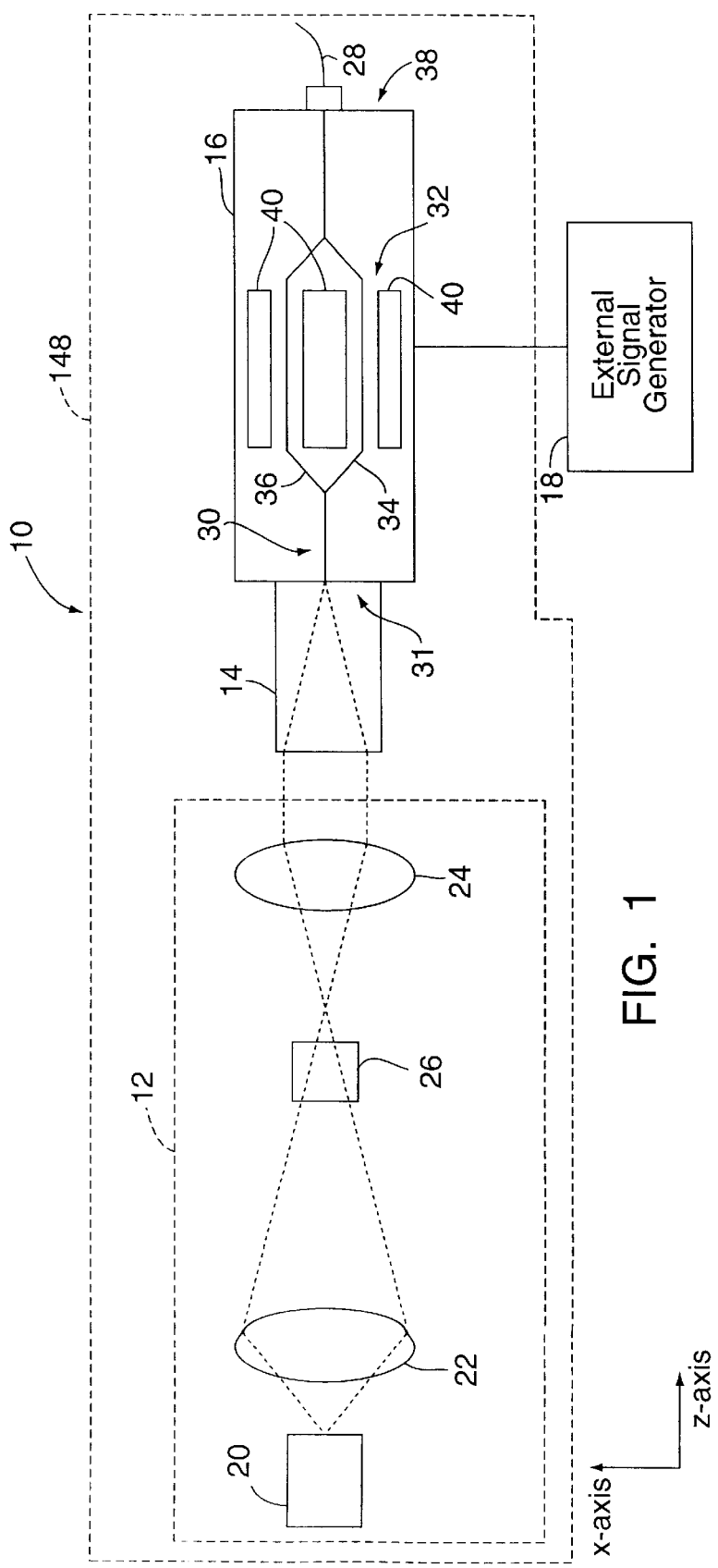
FIG. 1 is a diagrammatic block diagram of one embodiment an integrated optical transmitter according to the present invention.

FIG. 1 illustrates a preferred embodiment of an integrated optical transmitter according to the invention, generally designated 10, for generating a modulated optical beam having a predetermined wavelength of light. The optical transmitter 10 includes a optical head assembly 12 that includes an optical beam generator, such as the laser diode 20. The laser diode 20 generates a polarized optical beam of light having a known wavelength. The Graded Index (GRIN) lens 14 is coupled directly to the optical modulator 16 for receiving the formed optical beam from the optical head assembly 12 and providing the beam to the modulator 16. An external signal generator 18 provides a signal, such as a CATV or telecommunications signal, to the modulator 16 which impresses the signal onto the optical beam.

As shown in FIG. 1, the optical head assembly 12 includes a laser diode 20 and a pair of aspheric optical lenses 22,24 for focusing and collimating the optical beam emanated from the laser diode 20. The first aspheric lens 22 collects and focuses the beam, creating a magnified image of the source the back focal plane of the lens 22. The second aspheric lens 24 collimates the light, i.e., converts diverging light rays to parallel rays. An optical isolator 26 disposed between the two lenses 22,24 prevents any reflected light from propagating back to the laser diode 20. For example, in the absence of the isolator 26, any light reflected by connectors or splices in the communication link of which the optical transmitter 10 is a part can propagate down the optical fiber 28 and back to the laser diode 20. Instead, the reflected power is absorbed or diverted by the optical isolator 26. It is understood that the optical isolator can be placed at other points in the optical system, for example, between the second lens 24 and GRIN lens 14. Preferably, the optical isolator 26 is located as shown in FIG. 1, advantageously allowing the isolator 26 to be of a small diameter. Preferably, the lenses 22 and 24 are aspheric; however, as understood by one of ordinary skill in the art, apprised of the disclosure herein, the lenses 22 and 24 can be of other types, such as spherical. Aspheric lenses are preferable because they can collect the widely divergent light from the laser diode 20 and focus and collimate such light with minimal aberration and loss of optical power.

The collimated light from the second lens 24 is directed to the GRIN lens 14, which focuses the light to a small enough spot size, and low enough divergence, to efficiently couple the light into an optical waveguide 30 of the optical modulator 16. The GRIN lens 14 can be rigidly secured to the optical head assembly 12. The modulator 16 modulates the light in response to an electrical signal, such as a communications signal provided by the external signal generator 18.

The laser diode 20 can be one of many types of laser diodes known in the art. The laser 20 can be a distributed feedback (DFB) laser, a distributed Bragg reflector (DBR) laser, a super structure grating distributed back Bragg reflector (SSG-DBR), and grating assisted coupler with sampled rear reflector (GSCR) laser. Such lasers can be of particular benefit in a Dense Wavelength Division Multiplexed (DWDM) laser communication system. For example, an optical transmitter 10 that includes a laser diode 20 capable of operating at a wavelength of 1550 nm, such as a DFB laser, and that is tunable over a portion of the range of wavelength used in a DWDM system can be of significant benefit. The inventor can also include a widely tunable laser, such as the SSG-DBR and the GSCR laser types, used as the laser 20 to provide an optical transmitter that is tunable over, for example, a 60 nm wavelength range that includes 1550 nm. An optical transmitter 10 that includes a laser 20 that operates at a wavelength of 980 nm can also be particularly advantageous in a optical communication system as a pump source for an Erbium Doped Fiber Amplifier (EDFA).

The two aspheric lenses 22,24 advantageously allow flexibility in the choice of the type of the laser diode 20. More particularly, the two lens system allows use of a laser diode 20 that is mounted in a hermetic housing, e.g. a "TO-5.6 can." Such a laser diode is more convenient to handle, and the hermetic housing protects the laser diode 20 from atmospheric contaminants. Coupling between the laser diode 20 and modulator 16 is generally inefficient if only one lens 24 is used, because the divergence of the laser beam at the output of commercially available lasers in TO-5.6 cans is too great. The collimated beam provided by a single lens 24 may be much larger than the beam size that can be accepted by the GRIN lens 14. Focusing the beam with the first lens 22 and using a second lens 24 to collimate the beam allows the beam size to be optimized for the GRIN lens 14, in spite of limitations imposed by the TO-5.6 can. It should be recognized, however, that a single lens 24 can be used to collimate the optical beam, provided the laser diode 20 generates a beam that, when collimated, can be accepted by the GRIN lens 14.

Other variations of the preferred embodiment are possible, such as detuning the optical train at a selected location to reduce the sensitivity of the optical train at that point to changes in alignment caused, for example, by thermal expansion. For example, by using a GRIN lens 14 that is slightly shorter than is normally used for lowest power loss, a larger than normal optical beam is presented by the GRIN lens 14 to waveguide 30. Although angular misalignment will cause the position of the beam at the end of the GRIN lens to move along the X and/or Y axes, the beam is more likely to continue to fill the waveguide with light, due the larger size of the beam. Hence, misalignment sensitivity is lowered, though, the total power coupled into the waveguide 30 is reduced relative to the case when the GRIN lens 14 provides a beam better matched to the beam size naturally accepted by waveguide 30. The waveguide can also be modified to accept a larger beam from the GRIN lens 14, resulting in even further reductions in alignment sensitivity. However, some penalty in power loss is likely when using the shortened GRIN lens 14 due to aberrations in the optical properties of the beam which is presented to waveguide 30. Such techniques for reducing sensitivity to misalignment can be applicable to the other embodiments and variations thereof disclosed herein, or that are readily envisioned by one of ordinary skill in the art in light of the disclosure herein.

In other variations of the preferred embodiment, the sensitivity to one kind of translation or rotational misalignment is reduced at the expense of increased sensitivity to some other kind of translation or rotational misalignment, or at the expense of increased power loss. In general, where ever the beam is collimated or nearly so, the X, Y and Z sensitivities are reduced at the expense of greater rotational sensitivity. On the other hand, in places where the beam is focusing or expanding, the rotational sensitivities are reduced at the expense or greater X, Y and Z sensitivity.

The modulator 16 is typically an integrated optical circuit (IOC) fabricated in lithium niobate ($LiNbO_3$). The modulator includes a waveguide 30 at the receiving end 31 of the modulator 16 that directs the optical beam to a Mach-Zehnder Interferometer (MZI) 32. As the optical beam enters the interferometer 32, the beam is split and propagates into two parallel paths, or arms, 34,36 which are then recombined at the transmitting end 38 of the modulator. The interfero-meter 32 includes a plurality of electrodes 40 disposed on both sides of the arms 34,36. A communications signal provided by the external signal generator 18 varies the voltage applied to the electrodes and controls the velocity of light passing through each arm of the interferometer, via the electro-optic effect in lithium niobate. Depending on the applied voltage, the light in each arm 34,36 of the interferometer 32 can be made to constructively or destructively interfere when the two beams are recombined at the transmitting end 38, which makes high speed switching possible. In this manner, the communications signal provided by the external signal generator 18 is impressed onto the beam of light.

Typically, the interferometer 32 is set to be midway between constructive and destructive interference when no signal voltage is applied, by introducing $\lambda/4$ phase difference between the two light beams in the arms 34,36 of the interferometer. The signal voltage applied to the electrodes 40 causes the light in the arms of the interferometer to either completely constructively interfere ("on" state), or destructively interfere ("off" state). The phase difference between the light beams in the two arms of the interferometer, with no signal applied, is referred to as the bias point of the interferometer.

Assembly and alignment of the optical components of the transmitter 10 are critical to overcome concerns associated with prior art optical transmitters. In the prior art, the optical components of the transmitter are mounted fixedly to each other and to a common platform or bed. The different coefficients of thermal expansion of each optical component results in thermal expansion stresses on the components when they are heated or cooled, resulting in misalignment of the components and possible altering of their optical characteristics. The modulator 16 is particularly sensitive to such stresses because of the piezoelectric properties of the lithium niobate substrate of the modulator 16, and the stresses can cause the bias point to change from its optimum setting. Hence, as described below, in the present invention the modulator 16 can be mounted with a compliant adhesive to prevent stresses or deflections in the package from being transferred to the modulator.

Figure 2:
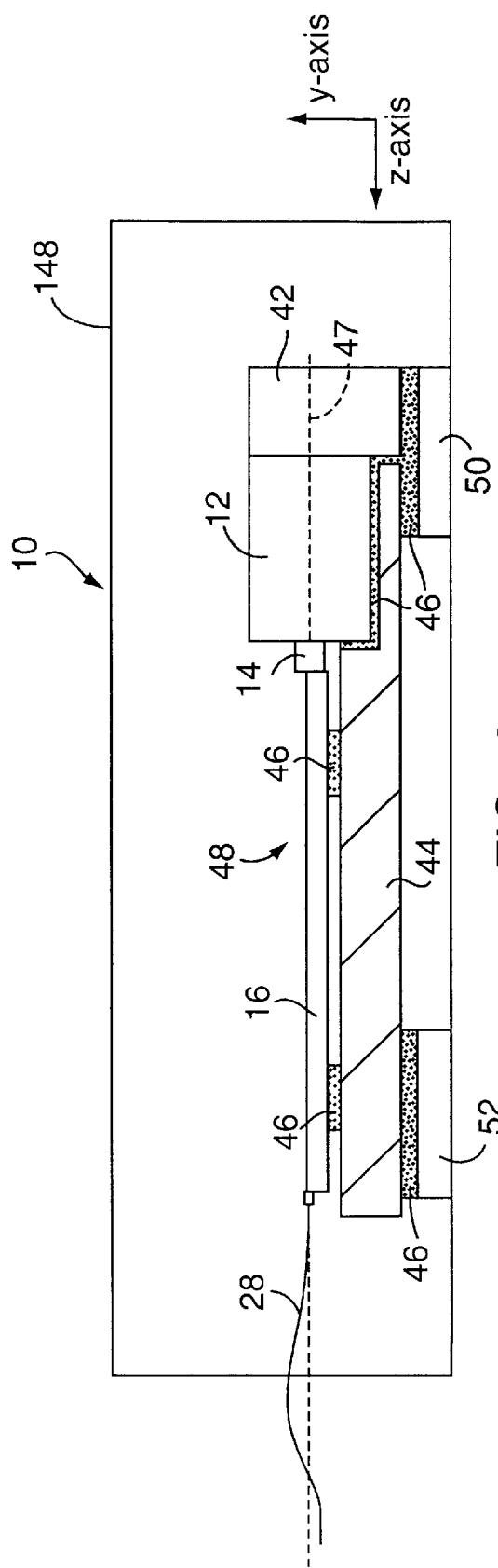
FIG. 2 is a side elevational view of an integrated optical transmitter of FIG. 1.

FIG. 2 illustrates the mechanical structure of an optical transmitter 10 according to the present invention. The components of the optical head assembly 12 are secured relative to each other, such as by rigidly securing the laser diode 20, and the aspheric lenses 22 and 24 to a mounting plate 78 (see FIG. 11). The GRIN lens 14 is also secured to the optical head assembly 12, thereby securing the laser 20, lenses 22, 24 and the GRIN lens in a fixed optical relationship relative to each other. The optical head assembly 12 with the GRIN lens 14 is then mounted to an upper surface of a common optical bed 44 by a compliant adhesive 46, such as RTV, Ecosorb and "Ablestick". The optical head assembly 12 is mounted on a recessed stepped portion of the optical bed 44 at one end in order that the optical beam generated at the focal point of the GRIN lens 14 aligns with input facet 31 of waveguide 30 (see FIG. 1), which is located at the upper surface of the modulator substrate 16. The bottom of the modulator 16 is also secured to the optical bed 44 with the compliant adhesive 46. The GRIN lens 14 can be rigidly secured to the optical modulator 16 by an appropriate epoxy.

The compliant adhesive 46 isolates the optical head assembly 12, the GRIN lens 14 and the modulator 16 from the effects of thermal expansion, and minimizes the stress on both the modulator 16 and the optical head assembly 12 as these components thermally expand and contract during manufacture or operation of the optical transmitter 10. Stresses are not only deleterious to optical alignment because of small deflections that occur at critical points in the optical train, but, as noted above, stresses can also affect the bias point of the Mach-Zehnder modulator 16.

Thermal control of the optical head assembly 12 and modulator 16 can further reduce misalignment of and stresses on the optical components. As shown in FIG. 2, a thermal transfer plug 42 couples a rear portion of the optical head assembly 12 to a thermoelectric cooler (TEC) 50 to transfer heat therebetween. A second TEC 52 is coupled by the compliant adhesive 46 to the optical bed 44. The TECs 50,52 remove or add heat from the modulator 16 and optical head assembly 12, in order to maintain optimum operating temperature(s). A thermistor (not shown) mounted in the thermal transfer plug 42 monitors the temperature of the optical head assembly 12. The optical bed 44 also helps to minimize thermal gradients across the modulator 16 which can create internal stresses that affect its bias point.

Figure 3:
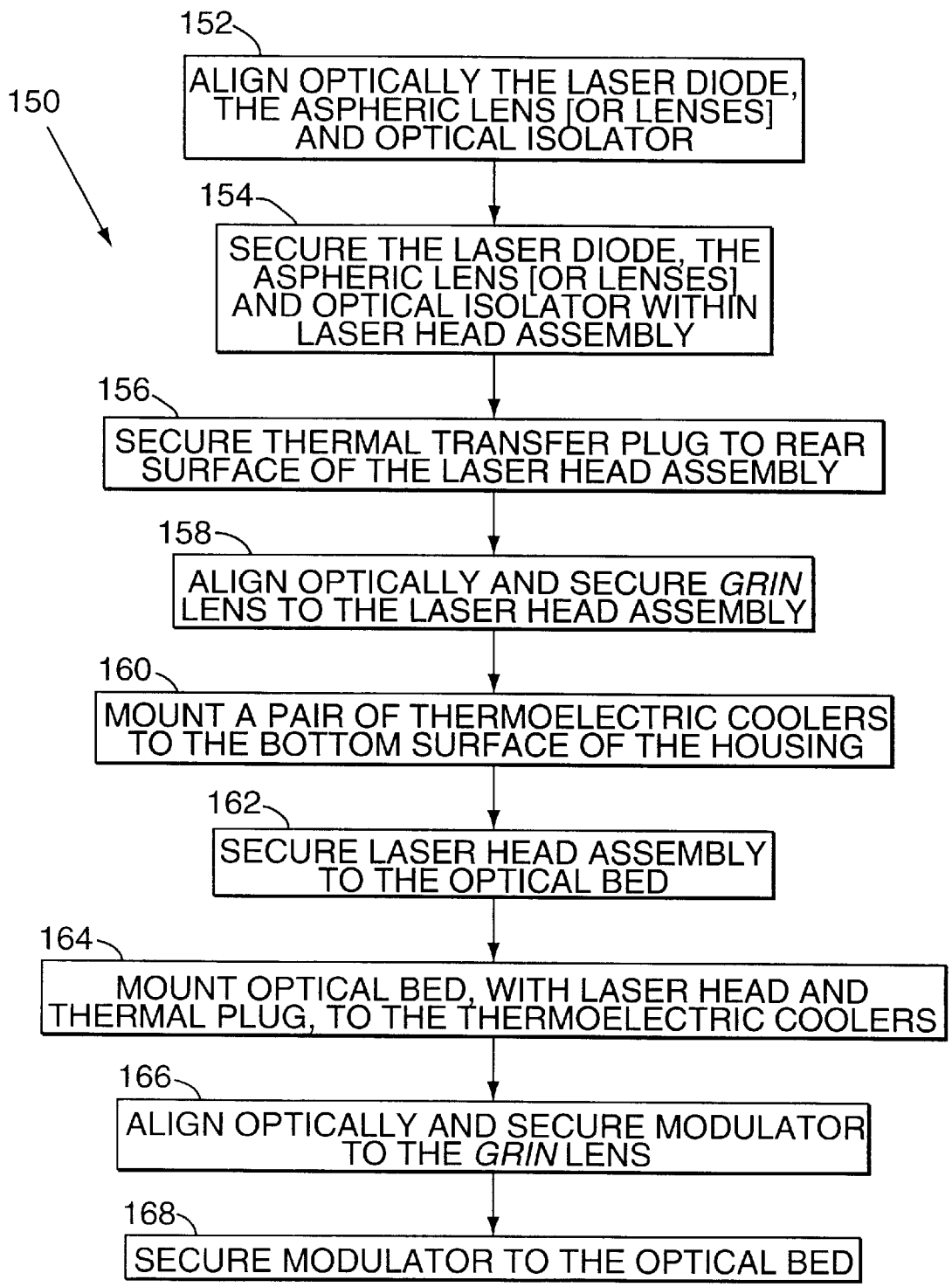
FIG. 3 is a diagrammatic illustration of a fabrication process for the modulator of FIG. 1.

A method 150 of fabricating the optical transmitter 10 of FIG. 2 is shown in blocks 152–166 of the functional diagram of FIG. 3. With reference to blocks 152–156, the laser diode 20, aspheric lenses 22,24 and optical isolator 26 are aligned to provide a collimated beam having an output power within a predetermined level. These components are then secured within the optical head assembly 12. The thermal transfer plug 42 is then secured to the rear surface of the optical head assembly 12. In block 158, the GRIN lens 14 is first aligned and then secured to the optical head assembly 12. A pair of TECs 50,52 are mounted to lower inside surfaces of the housing 148 (see FIG. 2). As shown in block 162, the optical head assembly 12 is compliantly secured to the optical bed 44, which is then mounted to the thermoelectric coolers in block 164. In block 166, the modulator 16 is aligned and secured to GRIN lens 14 by epoxy such that the focal point of the lens is positioned at the input facet 31 of the waveguide 30 of the modulator. In block 168, the modulator is secured to the optical bed 44.

Figure 4:
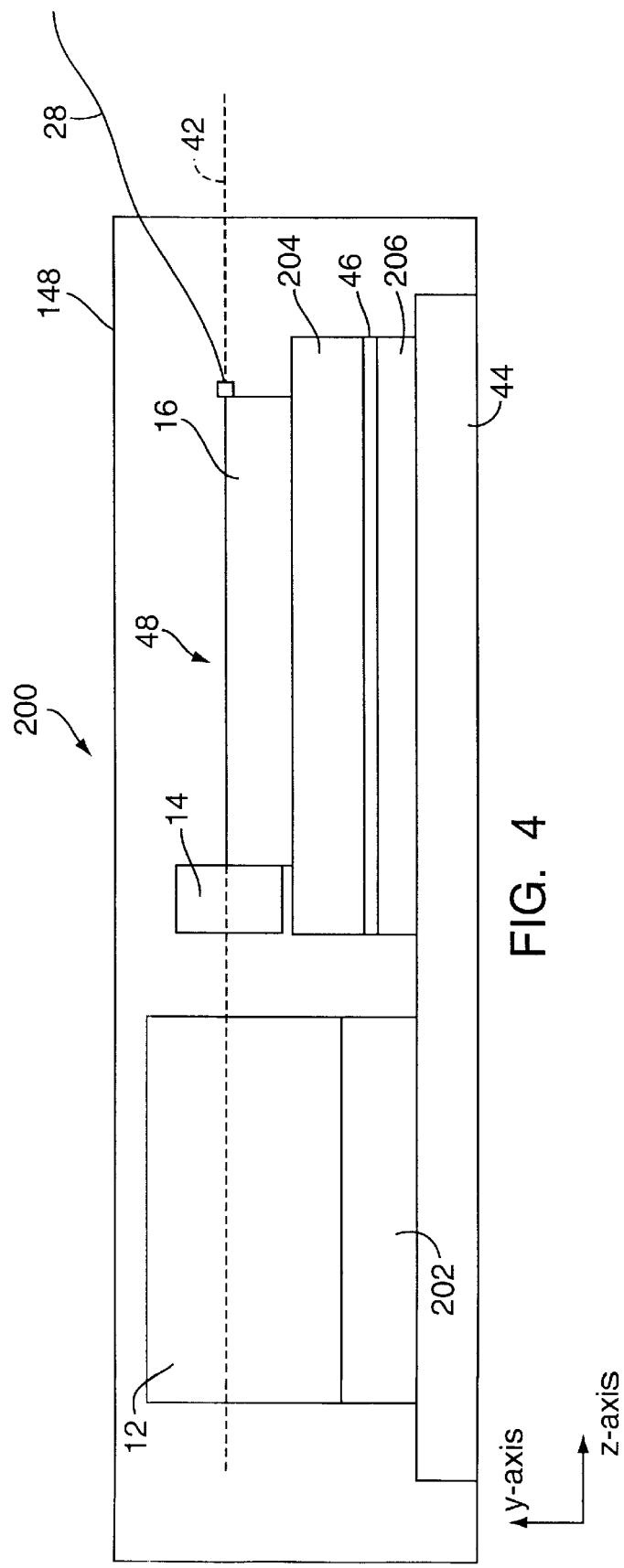
FIG. 4 is a side elevational view of a second embodiment of an integrated optical transmitter embodying the present invention.

In another embodiment 200 of the present invention shown in FIG. 4, the optical transmitter 200 includes an optical head assembly 12 and a GRIN lens/modulator assembly 48 that includes the GRIN lens 14 secured to the modulator 16. The common optical bed 44 mounts the assemblies 12 and 48, and the bed 44 is secured to the housing 148, such that the optical assemblies 12 and 48 are fixed in optical relationship to each other with the optical axis 42 extending along the Z-axis.

The optical head assembly 12 is fixed directly to a carrier plate 202 which is secured to the optical bed 44. The GRIN lens/modulator assembly 48 is secured to a mounting block 204 composed of the same material, lithium niobate, as the modulator in order to reduce the effects of thermal expansion. The under surface of the mounting block 204 is secured to an upper surface of a second carrier plate 206 by a compliant adhesive 46. The GRIN lens 14 and optical head assembly 12 are laterally-spaced on the optical bed 44 to align optically, but are not coupled together. The optical head assembly 12 and the modulator/GRIN lens assembly 48 can thus expand and contract independently to minimize the stresses associated with thermal expansion. Moreover, the integrated optical transmitter of FIG. 4 can be assembled in distinct steps which may be separate in time and location.

In the embodiment of FIG. 4, the optical head assembly 12 remains fixedly secured relative to the optical bed 44. On the other hand, the compliant adhesive 46 permits the modulator to move orthogonally in the x-axis, y-axis and z-axis to minimize stress on the modulator 16 as the components thermally expand and contract during manufacture or operation. This movement eliminates stress to the modulator 16 which can affect the bias point of the Mach-Zehnder modulator 16.

One might expect that the independent movement of the GRIN lens/modulator assembly 48 will dramatically affect the power output and optical characteristics of the optical beam. This can be true of an optical transmitter wherein the optical beam generated by the laser diode 20 is directly focused to the input facet of the modulator 16. Any movement or misalignment of the focused beam increases power loss. According to the invention, it has been determined, however, that use of a collimated beam between the optical head assembly 12 and the GRIN lens 14 reduces the sensitivity of power loss to misalignment in the orthogonal directions (X, Y and Z). The optical transmitter 200 of FIG. 4, therefore, collimates the portion of the beam that propagates between optical head assembly 12 and GRIN lens 14, to reduce power loss as a result of misalignment or movement of the components in the orthogonal axes. This feature permits the optical head assembly 12 and GRIN lens 14 to effectively "float" independently with reduced effect to the output power of the beam, if the motion of the GRIN lens relative to the optical head assembly 12 can be constrained to be in the X, Y or Z directions only.

Figure 5:
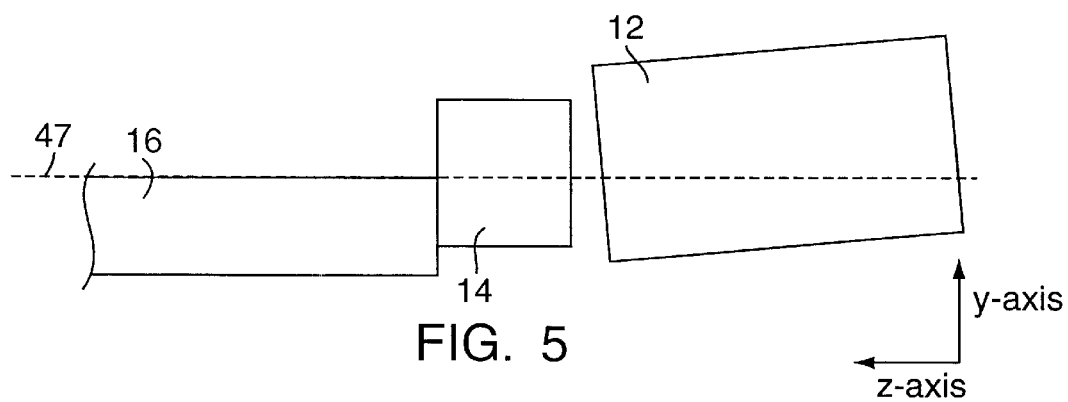
FIG. 5 is a expanded side elevational view of a portion of the optical transmitter of FIG. 4 wherein the optical head assembly is tilted about the X-axis.
Figure 6:
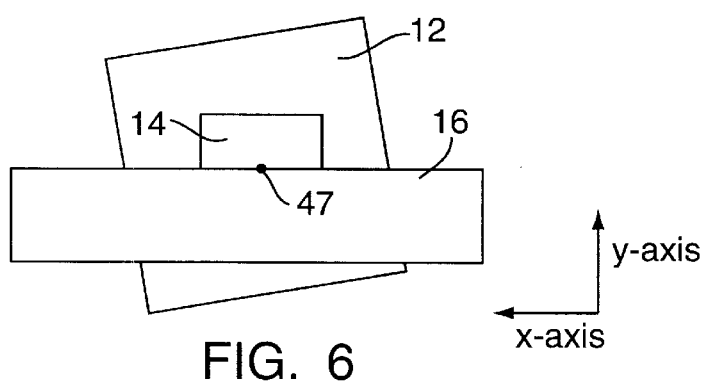
FIG. 6 is a expanded front elevational view of a portion of the optical transmitter of FIG. 4 wherein the optical head assembly is tilted about the Z-axis.
Figure 7:
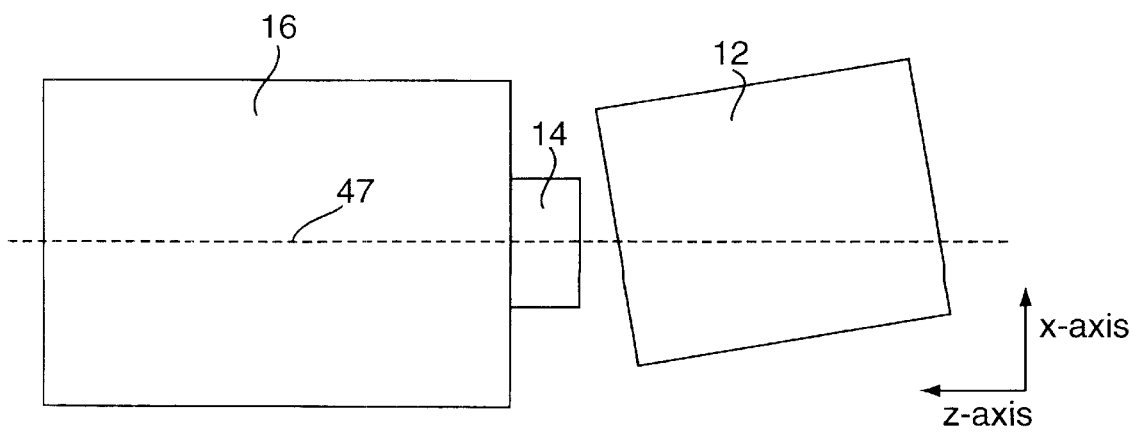
FIG. 7 is a expanded top plan view of a portion of the optical transmitter of FIG. 6 wherein the optical head assembly is tilted about the Y-axis.

There is a tradeoff in desensitizing the optical beam to changes in the optical alignment in the orthogonal x, y, and Z directions: the optical beam is sensitive to angular misalignment, such as pitch (rotation about the X-axis, shown in FIG. 5), roll (longitudinal rotation about the Z-axis, shown in FIG. 6), and yaw (horizontal rotation about Y-axis, shown in FIG. 7) of any of the components. Measurements made with typical optical components indicate that the compliant adhesive preferably constrains pitch or yaw tilt of the GRIN lens/modulator assembly relative to the optical head assembly to within approximately 0.01° degree in order that power output from the modulator is not reduced significantly. Likewise, the X and Y position of the modulator, relative to the laser head, is preferably maintained to within approximately ±20 $\mu$m for the same reason. These tolerances must be held over the lifetime of the device (typically 20 years or more for telecommunications applications), even after exposure to storage temperatures ranging −40 to 85°. Any shrinkage of the compliant adhesive during assembly, such as from curing, should not cause movement of the modulator assembly 48 to exceed these tolerances, or must be compensated for by offsetting the modulator position prior to adhesive cure, or by X, Y, pitch, or yaw offsets during final assembly with the optical head assembly 12. Note that the preferred embodiment does not suffer from these severe requirements on the compliant adhesive because the optical train is made to be a single rigid unit, for example, by securing the GRIN lens 14 to the modulator 16 and to the optical head assembly 12.

Providing a collimated optical beam between the optical head assembly 12 and the GRIN lens 14 and modulator 16 also facilitates independent assembly and alignment of the optics of the optical head assembly 12 and the combined GRIN lens/modulator assembly 48. Each assembly 12,48 can be fabricated at different locations and then can be brought together and easily aligned to fabricate the transmitter 200. The modularization of the transmitter also allows any optical head assembly 12 to be easily combined or interchanged with any GRIN lens/modulator assembly 48, and replacement of either assembly to repair the transmitter or change the wavelength of the optical beam. In addition, the temperature of the laser 20 can be controlled independently of the GRIN lens/modulator assembly 48.

According to the invention, there is provided a method of fabricating and aligning the optics of each assembly 12,48. A test jig 60 (see FIGS. 8 and 9) includes a GRIN lens 62, mounted to an upper surface of a common test bed 64, for receiving an optical beam emitted from the assemblies being fabricated. An optical fiber 70 connects the transmitting end 66 of the lens 62 to a beam detector 68. The beam detector 68 measures the output power of the optical beam to provide feedback during the alignment procedure of the optical components of each assembly.

A vacuum chuck 72 is provided for mounting each of the assemblies 12,48. Both the vacuum chuck 72 and the test bed 64 include a precision ground engagement surface 74,74 for maintaining the vacuum chuck 72 and the test bed 74 at a precise known position in the x, y plane relative to each other. The use of the test bed 74 and the vacuum chuck 72 that can be precisely aligned permits the optical head assembly 12 and the GRIN lens/modulator assemblies 48 to be independently manufactured and require minimal alignment when assembled together to form the transmitter 200.

Figure 10:
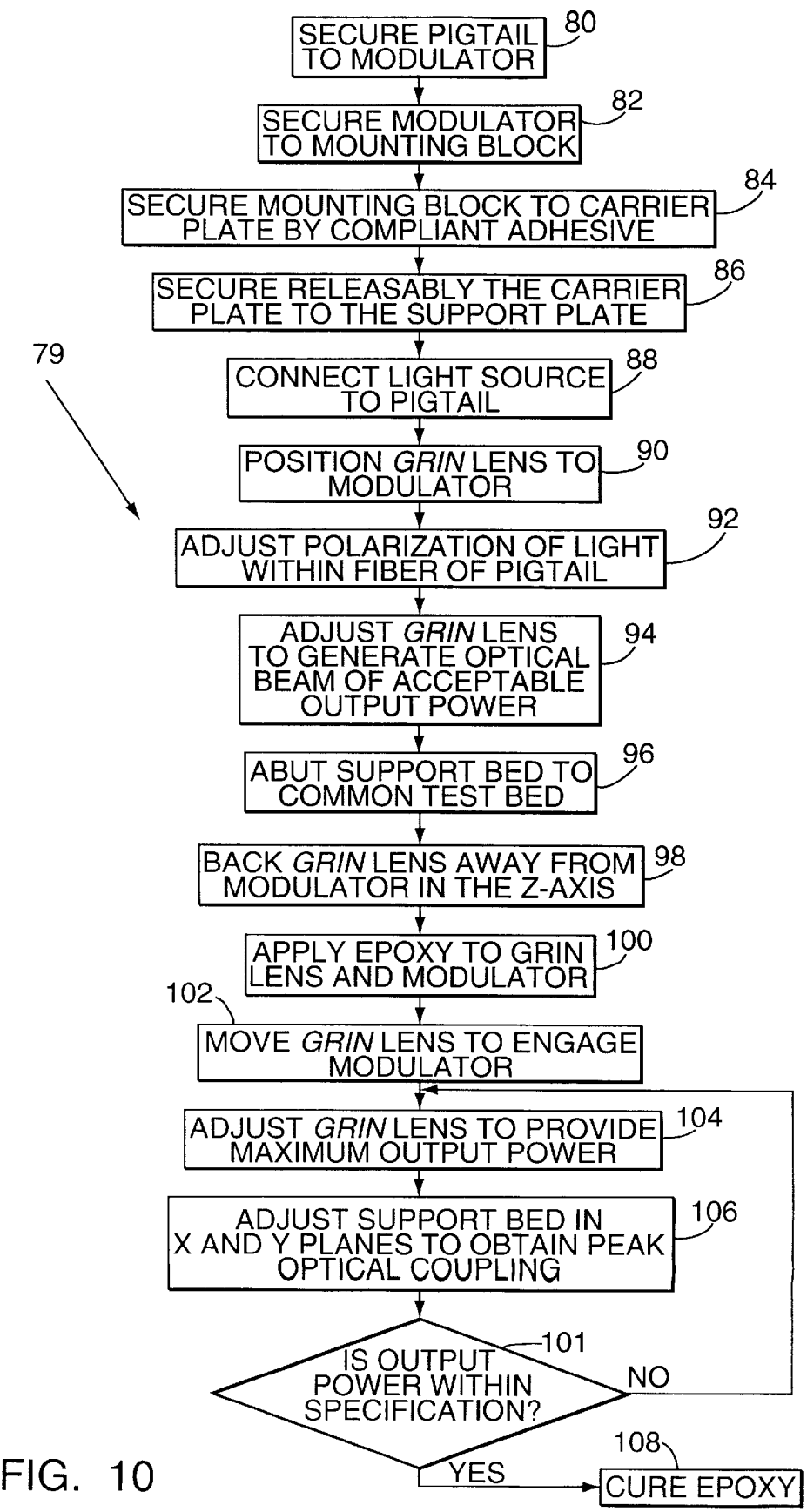
FIG. 10 is functional diagrams of a preferred general sequence of steps for fabricating and aligning the GRIN lens/modulator assembly of FIG. 4.

Blocks 80–108 of the functional diagram of FIG. 10 illustrate a method 79 of fabricating the GRIN lens/modulator assembly 48 and aligning the optical components thereof. Referring to block 80 of FIG. 10 and to FIG. 8, the fiber-optic pigtail 28 is secured to the transmitting end 38 of the modulator 16. In blocks 82–86, the modulator is secured fixedly to the mounting block 204. The mounting block is then mounted to the upper surface of the carrier plate 206 at a predetermined position and orientation by the compliant adhesive 46. The carrier plate 206 is then releasably secured to the vacuum chuck 72 at a known position. Referring to blocks 88–90, a light source 76 is connected to the pigtail 28 of the modulator 16 to emit an optical beam from the receiving end 31 of the modulator. The GRIN lens 14, using a second vacuum chuck (not shown), is positioned at the receiving end 31 of the waveguide portion 30 of the modulator 16. In block 92, the polarization within the fiber of the pigtail 28 is adjusted to provide the maximum output and provide rough collimation of the optical beam. Referring to block 94, the position of the GRIN lens 14 is adjusted so that the output power of the optical beam from the GRIN lens 14 is at an acceptable value.

Referring to block 96, the vacuum chuck 72 is then abutted to the engagement surface 74 of the common test bed 64. In blocks 98–102, epoxy is applied to the interface between the GRIN lens 14 and the modulator 16. The GRIN lens 14 is adjusted to provide peak output power measured by the beam detector 68, as indicated in block 104. Such optimization of the optics ensures that the beam is propagating along the Z-axis with minimal pitch and yaw, but does not necessarily ensure that the beam is optically aligned in the X and Y directions.

Referring to blocks 106 and 101, the vacuum chuck 72 is then adjusted in the X and Y directions with respect to the engagement surface 74 of the common test bed 64 to obtain peak optical coupling. The alignment of GRIN lens 14 and vacuum chuck 72 may need to be done recursively or simultaneously until output power is within specification. When the output power is within specification, the epoxy is first cured using ultra-violet light and then oven cured (block 108).

Figure 11:
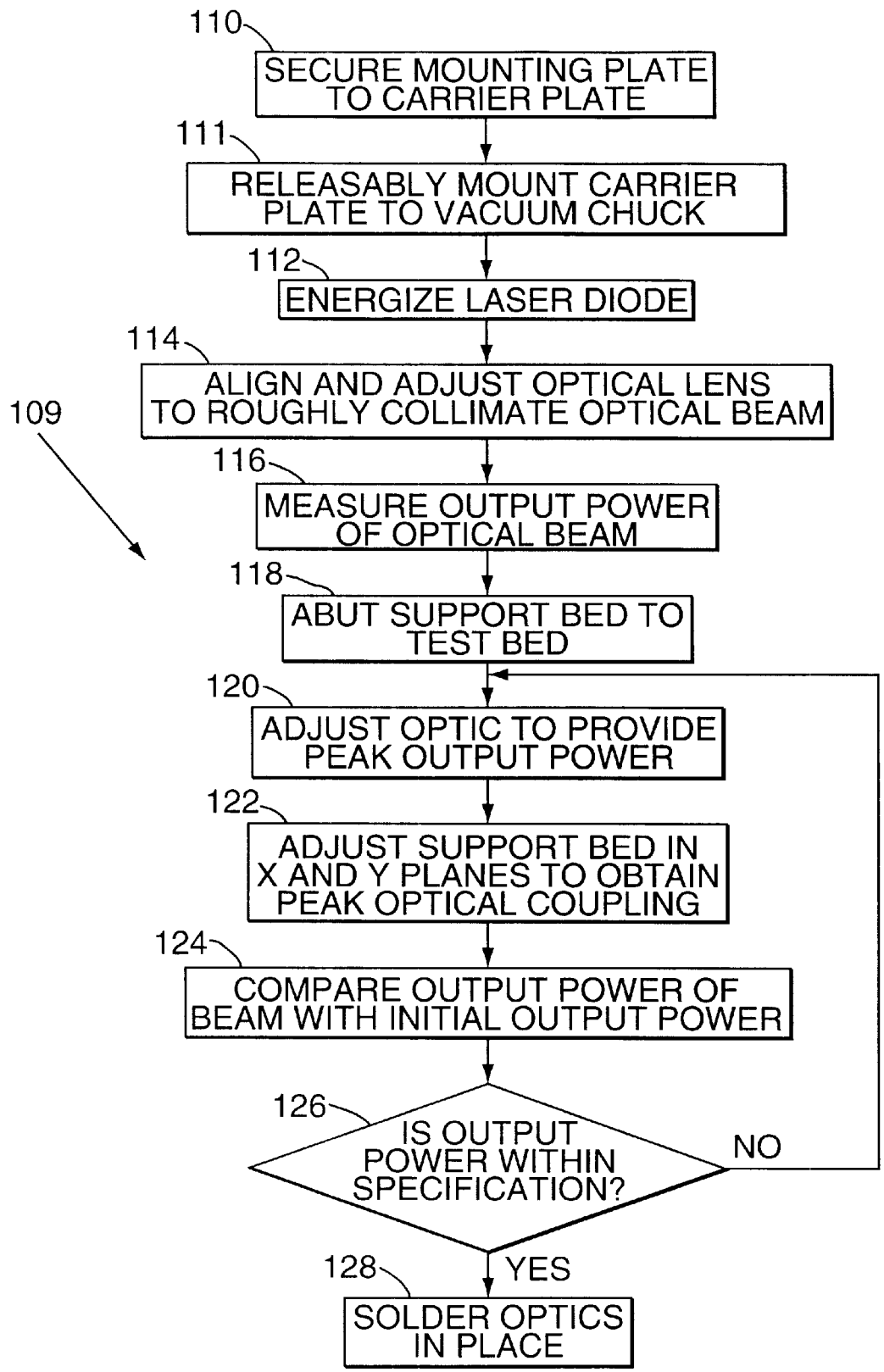
FIG. 11 is functional diagrams of a preferred general sequence of steps for fabricating and aligning the optical head assembly of FIG. 4.

A method 109 of fabricating the optical head assembly 12 is shown in blocks 110–128 of the functional diagram of FIG. 11. Referring to blocks 110–111 of FIG. 11 and to FIG. 9, a mounting plate 78 for the optical head assembly 12 is mounted securably to the carrier plate 202. The carrier plate 202 is then releasably secured to a vacuum chuck 72 that is similar to the one described above. The laser diode 20 is then secured to the mounting plate 78 at a predetermined position along the z-axis. In blocks 112–116, the optical lenses 22,24 are then located on the mounting plate 78 and aligned and adjusted to provide for rough collimation of the optical beam. Note that mounting plate 78 is not limited to planar geometry but may be of other geometric shapes including of a cylindrical shape. The laser diode 20 is energized and the output power of the optical beam is measured to provide a base measurement of the output power of the optical head assembly 12. Referring to blocks 118–120, the vacuum chuck 72 then engages the precision engagement surface 74 of the common test bed 64. The optics are then aligned to provide peak output power as measured by the beam detector 68. Optimization of the optics ensures that the beam is propagating along the z-axis with minimal pitch and yaw, but does not necessarily ensure that the beams are optically aligned in the X and Y directions.

In block 122, the vacuum chuck 72 is then adjusted in the X and Y directions with respect to the engagement surface 74 of the common test bed 64 to obtain peak optical coupling. The output power of the beam measured at the beam detector 68 is compared to the initial output power measurement of the laser diode 20 (see block 124). If the difference of the output power of the beams is not within specification, then the steps to adjust the optics and the position of the bed, as shown in block 126. The alignment of the optics and vacuum chuck 72 may need to be done simultaneously depending on the particular embodiment. In block 128, when the output power is within specification, the optics of the optical head assembly 12 are soldered in place.

Figure 12:
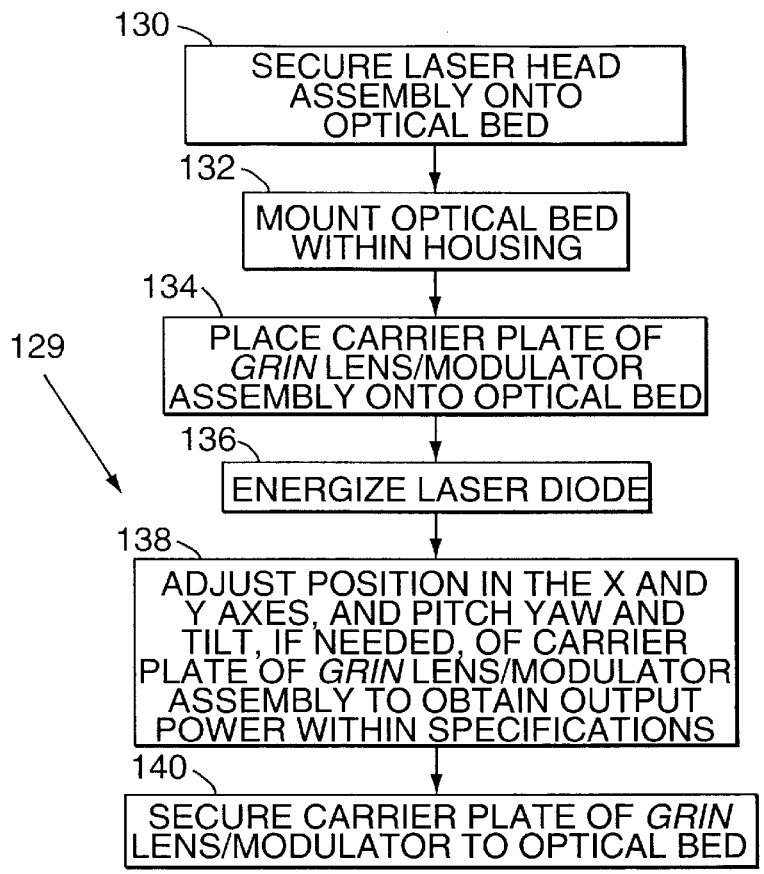
FIG. 12 is a functional diagram of a preferred general sequence of steps for fabricating the integrated optical transmitter of FIG. 4.

A method 129 of aligning the optical head assembly 12 and the GRIN lens/modulator assembly 48 to fabricate the transmitter 200 is shown in blocks 130–140 of the functional diagram of FIG. 12. Referring to block 130 and FIG. 4, the carrier plate 202 of the optical head assembly is secured fixedly to the optical bed 44 such that the optical path extends along the z-axis. In block 132, the optical bed 44 is mounted within the transmitter housing 148. A beam detector 68 is coupled to the fiber-optic pigtail 28 that is attached to modulator 16. In block 134, the carrier plate 206 holding the GRIN lens/modulator assembly 48 is positioned onto the optical bed 44 using a vacuum chuck such that the assembly 48 is located in front of the optical head assembly 12. In blocks 136–138, the laser diode 20 is energized, and the carrier plate 206 with the GRIN lens/modulator assembly 48 the X and Y position, as well as pitch and yaw, if needed, are adjusted until the optical power at the output of modulator 16 is within specification. The carrier plate 206 is then secured fixedly to optical bed 44 to form the integrated laser modulator assembly.

An advantage of the embodiment 200 of the present invention is that the collimation of the optical beam allows for the optics components to be optically aligned and laterally-spaced on an optical bed, but not fixed together. This permits the components to move independently of each other in response to changes in ambient temperature and minimizes the detrimental effects of the different coefficients of thermal expansion, while allowing the components to remain in a fixed optical relation relative to one another.

One of ordinary skill in the art, in light of the disclosure herein, recognizes that the optical modulator 16 is not limited to a Mach-Zehnder Interferometer and that other types of modulators, e.g. an Electro-Absorption (EA) modulator can be used. The optical modulator material is not limited to lithium niobate, but includes others such as glass or polymer or others to which interface optics can be mounted without damaging the modulator. Furthermore, even though the integrated optical transmitter is shown mounted within a housing to form a discrete module, one would recognize that a plurality of transmitters can be mounted onto a single optical bed or board. Note that the foregoing techniques, with slight modifications appreciated by one of ordinary skill in light of the present disclosure, can also be used in the fabrication of the embodiments shown in FIGS. 1 and 2.

Figure 13:
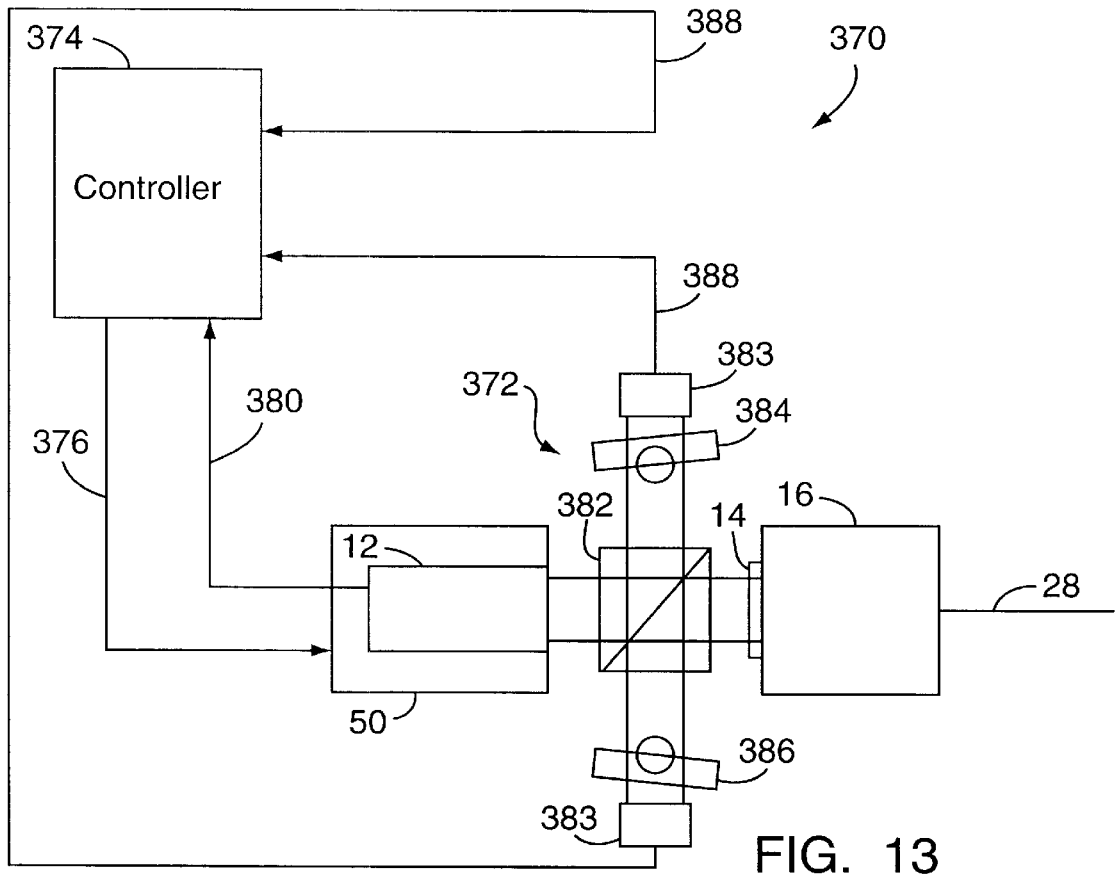
FIG. 13 is a simplified schematic illustration of an integrated optical transmitter according to the invention including a means for stabilizing the wavelength of the optical beam including a pair of optical filters and a pair of optical detectors.

The present invention can advantageously include elements for stabilizing the wavelength of the laser 20, and hence of the optical beam emanated by the optical transmitter 10. In the embodiment 370 of the present invention shown in FIG. 13, the optical transmitter 370 includes elements 372 for stabilizing the wavelength of the optical beam. It is known that the wavelength of light generated by the laser diode 20 is dependent upon the temperature of the laser diode 20 and upon the current supplied to the laser diode 20. As shown in FIG. 13, a thermoelectric cooler (50) in thermal communication with the optical head assembly 12 controls the temperature of the head assembly 12 to stabilize the wavelength of the laser 20. A controller 374 provides a temperature control signal at 376 to the TEC 50 for adjusting the temperature of the laser diode 20 in response to a feedback signal representative of the wavelength of the optical beam generated by comparing detected signals 388 and a signal at 380 representative of the temperature of the laser. In this manner, the wavelength of the optical beam may be stabilized or locked at a predetermined wavelength. Typically, laser temperature tuning of 10° C. or less is more than adequate to compensate for laser aging effects which can influence wavelength during the lifetime of the transmitter; therefore, alignment of the optical train, and the properties of the optical modulator 16 are typically not adversely affected by thermal expansion/contraction that accompanies the temperature change introduced by the wavelength stabilization.

Because a collimated beam is produced by the second aspheric lens 24 (see FIG. 1), the beam can be readily sampled between second aspheric lens 24 and the GRIN lens 14. Accordingly, in the embodiment shown in FIG. 13, a beam splitter 382 reflects approximately 1% of the light from the laser diode 20 out of the path between the second aspheric lens and the GRIN lens 14 and modulator 16. This light is then directed into a pair of detectors 383,383, such as photodiodes. The detectors' spectral response is highly influenced by a pair of angle-tuned narrow bandpass filters 384,386 disposed in front of the filtered detectors. The narrow bandpass filters 384,386 are rotated to change the incidence angle and thus the center transmission wavelength, which is a function of incidence angle. Accordingly, each filter filters the beam incident upon it in accordance with a spectral filter function that is determined by the physical structure of the filter and the angle of incidence of the incident beam.

Figure 14:
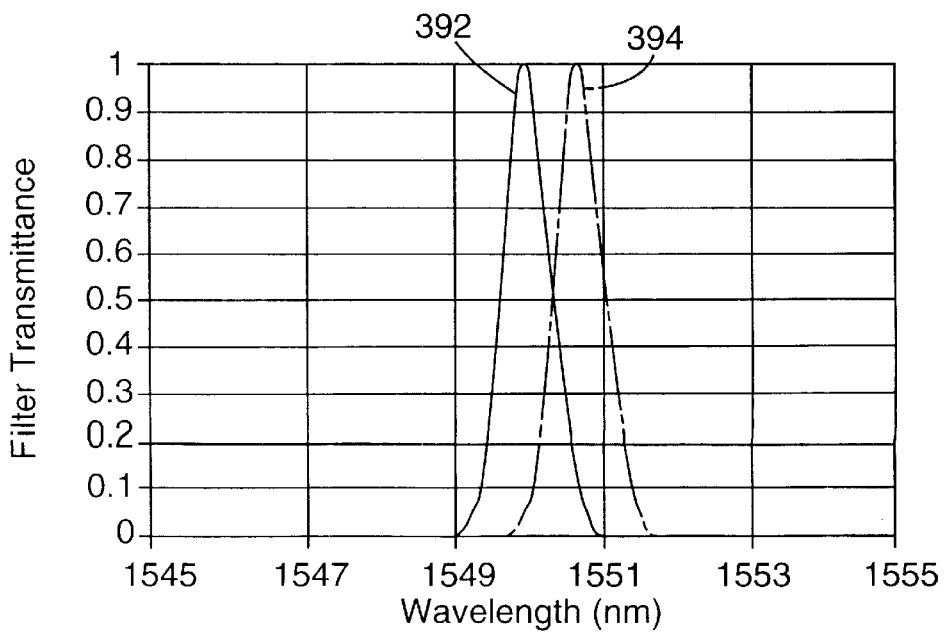
FIG. 14 is a plot of the spectral transmittance of the filters of FIG. 13.

With reference to FIG. 14, curve 392 represents the spectral filter function of the filter 384 and curve 394 represents the spectral filter function of the filter 386. Note that the spectral filter functions overlap, crossing at a crossing-point wavelength. Typically, wavelength of the laser diode 20 is stabilized to the wavelength at which the spectral filter functions cross. For example, in the operation of the wavelength stabilizer 372, the output from the detectors 383,383 changes as the emission wavelength of the laser diode 20 changes. If, for instance, the wavelength increases, the output from one detector 383 will decrease and the output from the other filtered detector 383 will increase. The outputs of the two detectors 383 are compared to generate a feedback signal responsive to the wavelength of the laser diode 20, such as by the controller 374 taking a difference between the outputs of the detectors 383, thereby monitoring the wavelength. By using the feedback signal, the controller 374 can generate command signals for changing the wavelength of the laser diode 20 by changing the laser current or the voltage to the thermoelectric cooler 50. One or more of the beam splitter 382, filters 384,386, detectors 383, as well as the controller 374 can be part of the optical head assembly 12, such by being mounted on the mounting plate 78, or alternatively, one of more can be mounted on the optical bed 44 or on a mounting plate or substrate mounted to the optical bed 44. The beam splitter 382, filters 384,386 and detectors 383 can form a modularized unit. The beamsplitter 382 can also be epoxied between the GRIN lens 14, which is epoxied to the modulator 16, and the optical head assembly 12. Mounting the splitter, filter and detectors as part of the optical head assembly 12 advantageously provides a modular optical head assembly 12 that includes elements for stabilization or tuning, as described below, of the wavelength of the laser diode 20.

In practice, one method for setting up the stabilizing elements 370 is as follows: Once the temperature and emission wavelength of the laser diode 20 are set to predetermined values, the narrow bandpass filters 384,386 are angle tuned by rotating the filters to overlap the spectral filter functions in a manner shown in FIG. 5. First, the filters 384,386 are first tuned to find the peak transmittance by monitoring the output from the detectors 383,383. The filters 384,386 are then rotated such that the output from the detectors 383,383 are approximately 0.5 of the peak value. Since the transmittance of the filters 384,386 is close to symmetric, the filter will need to be tuned in the right direction. This direction is known from the center wavelength relationship with incidence angle. The filters are then locked into place by laser welding which strongly couples the response from the detectors 383,383 to the input wavelength.

Figure 15:
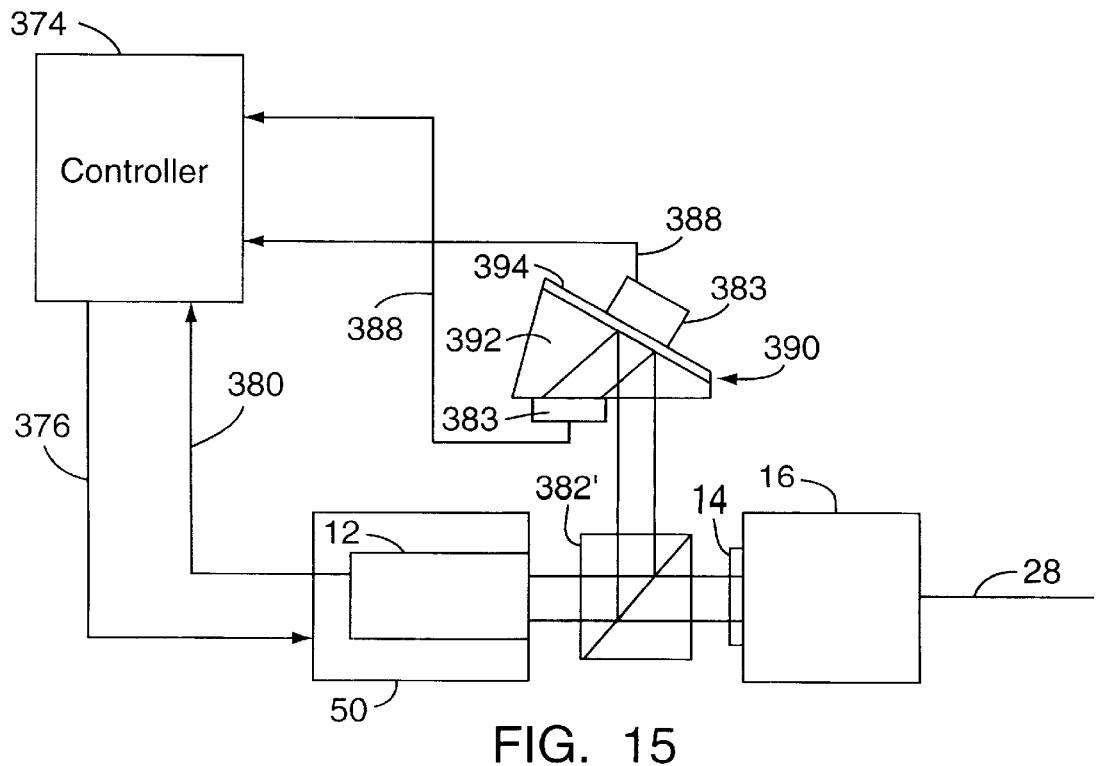
FIG. 15 illustrates a schematic of an integrated optical transmitter according to the invention including a means for stabilizing the wavelength of the optical beam including an optical filter and a pair of optical detectors.
Figure 16:
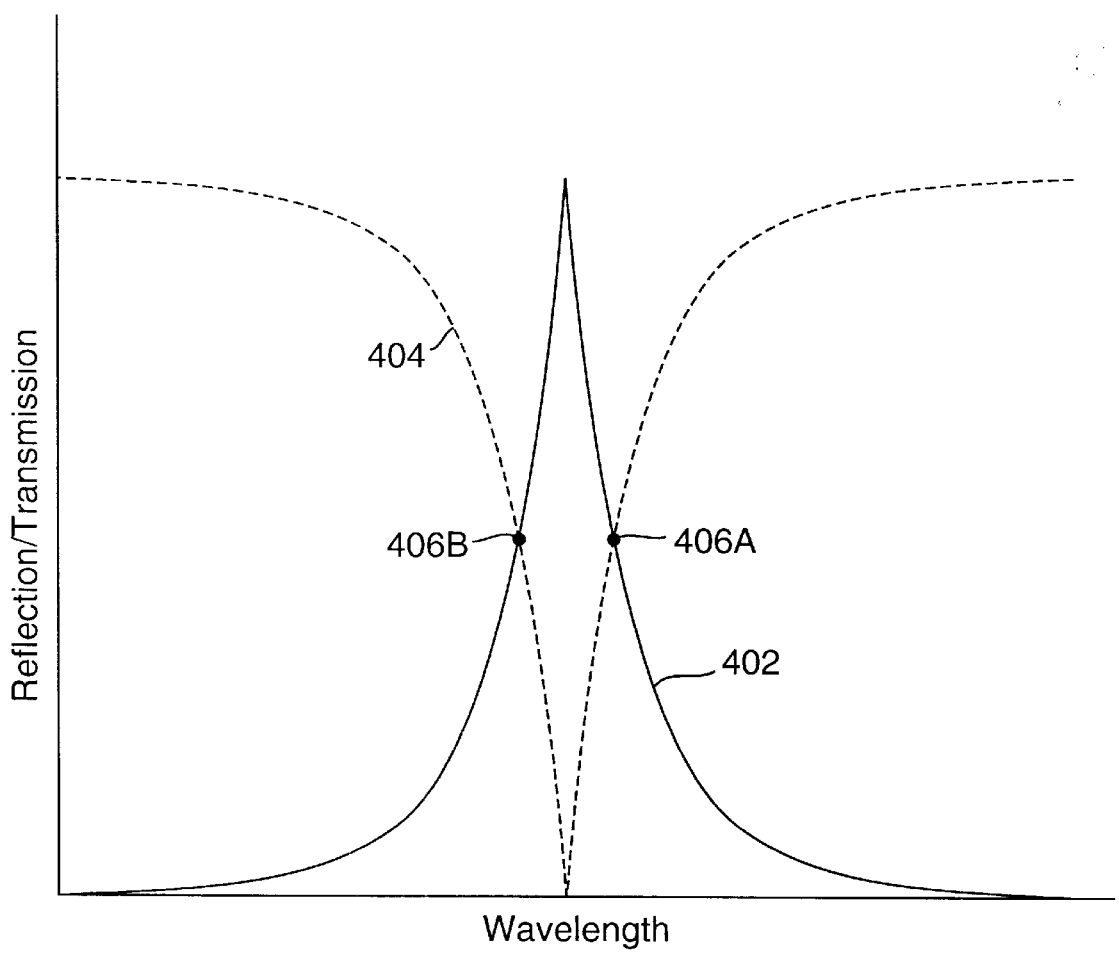
FIG. 16 illustrates spectral transmittance and reflectance of the optical filter of FIG. 15.

With reference to FIG. 15, reflected and transmitted beams of light from an optical filter can also be used for stabilizing or tuning the wavelength of the beam emanated by the optical head assembly 12. The beamsplitter 382' splits a single beam to an optical filter 390 that, preferably, includes a wedge shaped substrate 392 (for reducing etalon effects) having a filter layer 394 disposed therewith. The optical filter 390 mounts the detectors 383 such that one of the detectors receives a reflected beam and the other receives a transmitted beam. The reflected and transmitted beams are generally inversely related, as illustrated by the spectral filter functions 402 (transmitted) and 404 (reflected) shown in FIG. 16. The filter functions cross at the crossing points 406A and 406B. One of ordinary skill in the art, in light of the foregoing discussion regarding FIGS. 13 and 14, understands the use of the functions shown in FIG. 16 and the apparatus of FIG. 15 for stabilizing the wavelength of the laser radiation to a wavelength corresponding to one of the crossing points. One or more of the beam splitter 382, optical filter 390, detectors 383, as well as the controller 374 can be part of the optical head assembly 12, such as by being mounted on the mounting plate 78, or alternatively, one of more can be mounted on the optical bed 44 or on a mounting plate or substrate mounted to the optical bed to form a modularized unit. The beamsplitter 382 can also be epoxied between the GRIN lens 14, which is epoxied to the modulator, and the optical head assembly 12. Mounting the splitter 382, filter 390 and detectors 383 as part of the optical head assembly 12 advantageously provides a modular optical head that includes elements for stabilization or tuning, as described below, of the laser wavelength.

Figure 17:
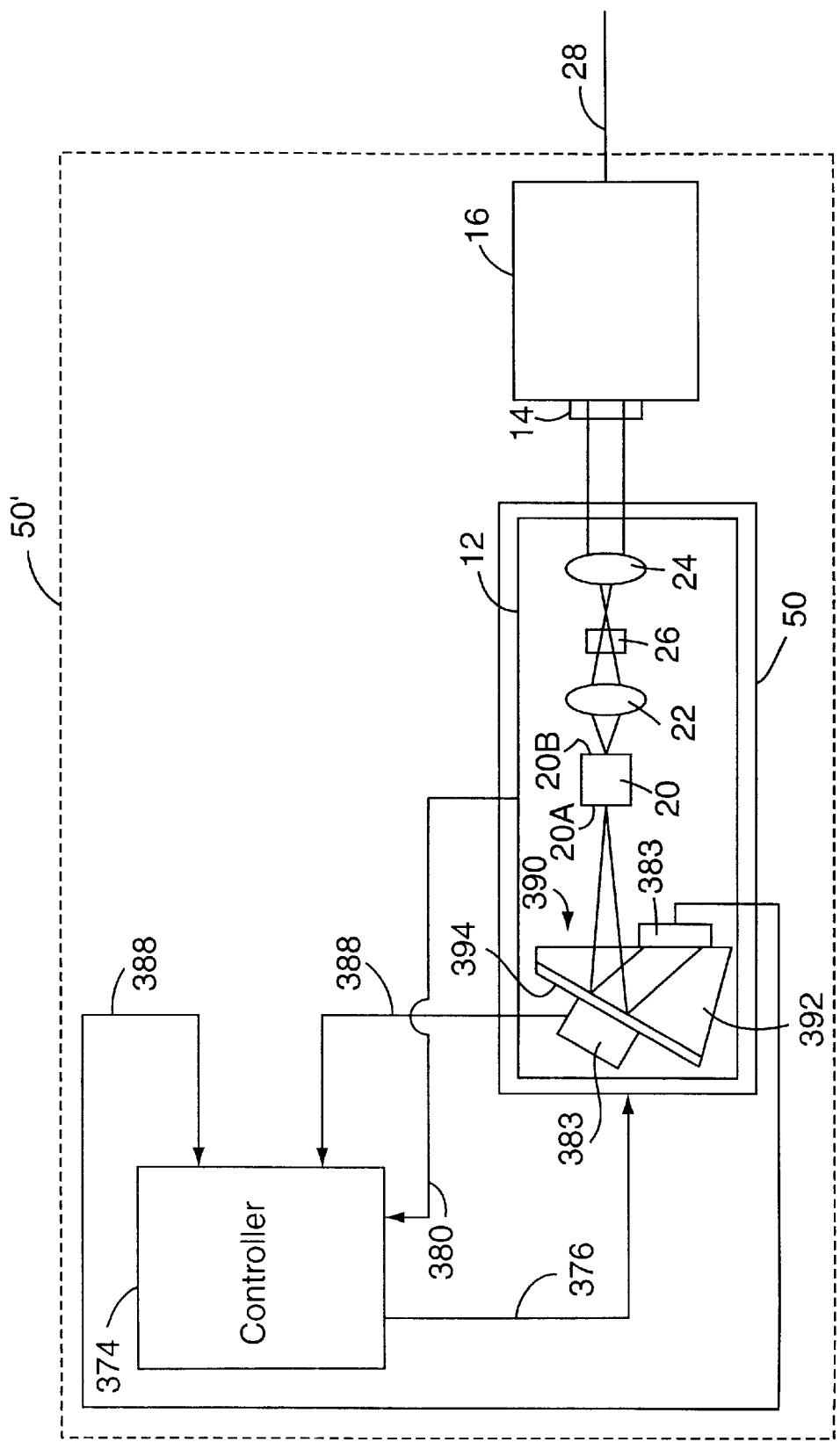
FIG. 17 illustrates a schematic of an embodiment of the invention wherein the optical head assembly includes an optical filter and a detector for sampling radiation from the back facet of the laser of the optical head assembly for stabilizing the wavelength of the optical beam.

FIG. 17 illustrates a preferred embodiment of the invention wherein the optical filter 390 receives a beam of radiation emanated from a back facet 20A of the laser 20, and wherein radiation from the front facet 20B is provided to the lenses 22,24 and optical isolator 26 for provision to the modulator 16. The optical head assembly 12 includes the optical filter 390 and the detectors 383. Furthermore, all the components of the head assembly 12, including the filter 390 and detectors 383, are temperature controlled by the thermoelectric cooler 50 for enhancing the stability of the optical transmitter. Note the at the embodiment shown in FIG. 17 advantageously does not require the use of a beamsplitter and provides an "in-line" design. The optical filter 390 and detectors can be included in the optical head assembly 12, as shown in FIG. 17, or can be mounted independently thereof.

Figure 18:
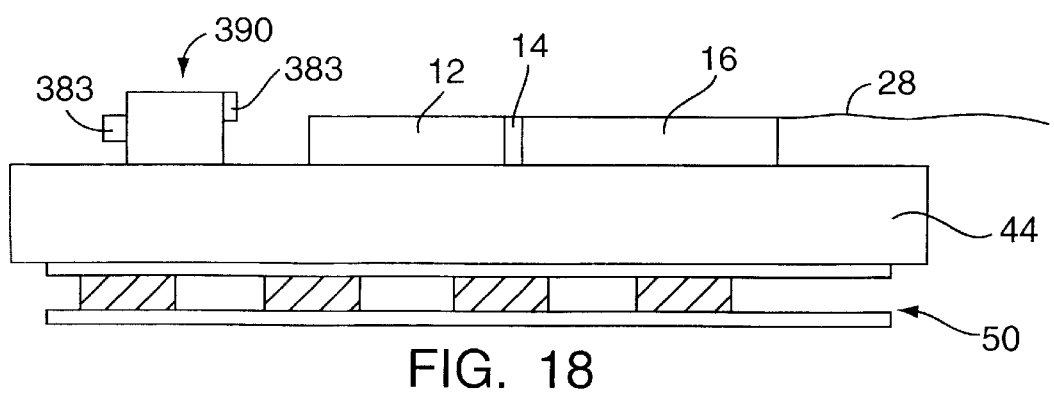
FIG. 18 illustrates another embodiment of the invention wherein the radiation from the back facet of the laser of the optical head assembly is sampled for stabilizing the wavelength of the optical beam.

FIG. 18 shows a elevational view of an embodiment of the invention wherein the optical filter 390 and detectors 383, optical head assembly 12 and modulator 16 are disposed on a common optical bed or mounting plate 44 in thermal communication with the thermoelectric cooler 50. The GRIN lens 14 can be secured to both the modulator 16 and the optical head assembly 12, or can be secured to the modulator 16 and spaced from the optical head assembly 12, such as shown in FIG. 4, where GRIN lens 14 and modulator 16 are referred to a forming an assembly 48.

Note that the above embodiments can be advantageously used to tune the wavelength of the laser 20, as well as stabilize the output of the laser 20 at a selected wavelength. As described above, the spectral filter functions cross at crossing point wavelength(s), where the outputs of the detectors are equal. A feedback signal for providing feedback for controlling the laser 20 is determined by comparing the signals of the detectors 383, such as by subtracting the signals to provided a nominal feedback signal of approximately zero when the wavelength of the laser 20 corresponds to the crossing point wavelength for stabilizing the wavelength at the crossing point wavelength. The controller can introduce a bias to the error signal, e.g., by adding or subtracting selected value to the difference of the outputs of the detectors, for stabilizing the wavelength of the laser 20 to a wavelength other than that of the crossing point wavelength. The crossing point wavelength can be selected so as to correspond to the center of the range of wavelengths over which the laser 20 is to be tuned.

Figure 19:
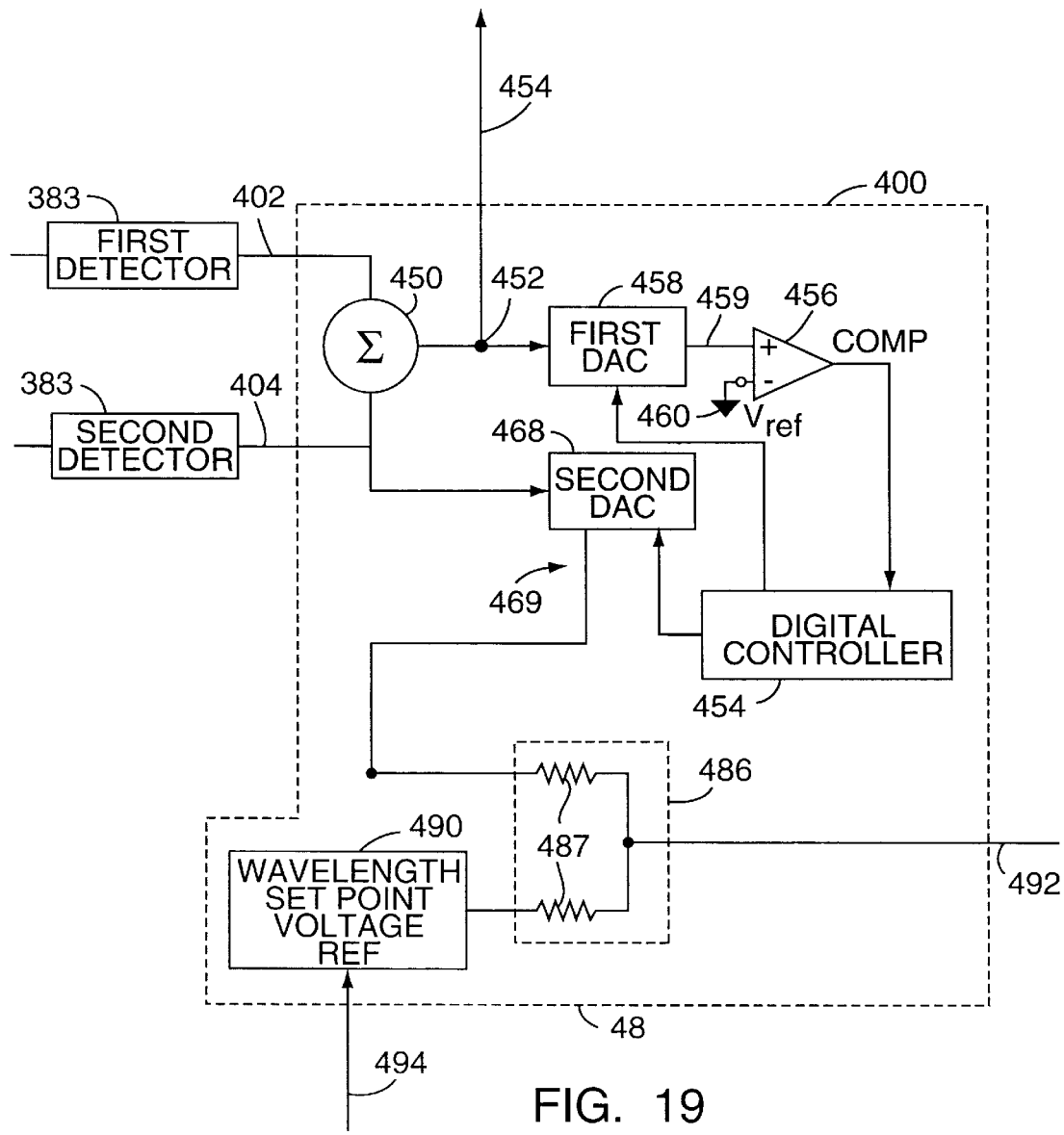
FIG. 19 illustrates a circuit takes a ratio of the sum of the outputs of the detectors for providing a feedback signal for stabilizing and/or tuning the wavelength of optical transmitter.

Preferably, the control circuit takes a ratio of the sum of the outputs of the detectors 383. One preferred ratioing circuit 400 is shown in FIG. 19. Each of the detectors 383 produces a detected signal, one of which is referred to herein as the first detected signal 402 and the other as the second detected signal 404. The summer 450, which can be a simple two resistor network, sums the first and second detected signals obtained from the first and second detectors 383. One advantage of using the sum of the signals in a ratio is that the voltage at point 452 is proportional to the total power being radiated by, for example, the laser 20 and can be made available, as indicated by reference number 454, for other uses, such as in a leveling circuit for stabilizing the power output of the optical transmitter 10.

The digital controller 454 senses the output of the comparator 456 to adjust the gain of the first digital-to-analog converter (DAC) 458 such that the output voltage 459 of the first DAC 458 supplied to the plus input of the comparator 456 is equal to a reference voltage Vref 460 provided to the negative input of the comparator 456. Accordingly, the gain of the first DAC 458, G1, multiplied by the sum of the first and second detected signals is equal to the voltage Vref.

Vref=(first detected signal+second detected signal)×G1

The digital controller 454 controls the second DAC 468 such that gain G2 of the second DAC 468 applied to the second detected signal is equal to the gain G1 of the first DAC 458. Thus G1=G2=Vref/(first detected signal+second detected signal)

and the voltage output 469 of the second DAC 468 is second detected signal×G1=(second detected signal×Vref)/(first detected signal+second detected signal)

A combiner 486, which can be a simple two resistor network including resistors 487, adds the output of the second DAC 468 to a set-point reference voltage (which is typically negative) provided by a set-point voltage reference supply 490 to provide a feedback signal 492 for use in controlling the wavelength of the laser 20, by controlling, for example, temperature of the laser 20 or the current supplied to the laser 20. The current or temperature is to reduce the error signal. An input 494 to the wavelength set point voltage reference supply 490 allows varying of the reference voltage provided by the supply 490 for tuning the wavelength of the radiation emanated by the laser 20 by varying the feedback signal.

The optical transmitter of the present invention is considered to be particularly advantageous when used as a transmitter in a Dense Wavelength Division Multiplexed (DWDM) system. For example, an optical transmitter 10 can include a semiconductor laser, such as a DFB laser, operating at a frequency of 1550 nm and that is tunable over at least a portion of the wavelength range typical of DWDM systems. The present invention can thus provide a stabilized, tunable optical transmitter capable of operation for many, if not all, of the channels of a DWDM system. Typically, prior art optical transmitters were suitable for operation at a wavelength corresponding to a single channel. Suitable lasers 20 can include the distributed feedback (DFB) laser noted above, and widely tunable semiconductor lasers such as a distributed back reflection (DBR) laser, a super structure grating distributed back reflection laser (SSG-DBR), and grating assisted coupler with sampled rear reflector (GSCR) laser.

An tunable optical transmitter 10 that includes a laser 20 that operates at a wavelength of 980 nm can also be particularly advantageous as a pump for an Erbium Doped Fiber Amplifier (EDFA). The wavelength of the optical transmitter 10 can be tuned to optimized the performance of the EDFA.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

We claim:

1. An integrated optical transmitter for use in an optical system, comprising:
   an optical head assembly including
      a laser diode for providing an optical beam; and
      a lens assembly including at least one lens for collecting said optical beam and generating therefrom a formed optical beam;
   an optical modulator for receiving said formed optical beam and for providing a modulated optical beam in response to received modulation signals; and
   interface optics adapted to receive said formed optical beam and to present the formed optical beam to said optical modulator, said interface optics providing optical coupling with said optical modulator to reduce insertion loss to the formed optical beam and to maintain a fixed optical relationship therewith.

2. The integrated optical transmitter of claim 1, wherein said interface optics comprises a graded refractive index lens which is fixedly mounted to said optical modulator and wherein said modulator is compliantly mounted to a mounting surface, and wherein said optical head assembly is fixedly mounted to said mounting surface such that said optical head assembly is spaced from said graded refractive index lens.

3. The integrated optical transmitter of claim 1 wherein said laser diode can produce laser radiation having a wavelength that is substantially equal to 980 nm.

4. The integrated optical transmitter of claim 1, wherein said laser diode is a DFB laser that can produce laser radiation having a wavelength substantially equal to 1550 nm.

5. The integrated optical transmitter of claim 1, wherein said laser diode is tunable over a wavelength range of approximately 60 nm, said range including a wavelength of 1550 nm.

6. The integrated optical transmitter of claim 1, wherein said laser diode is one of a distributed Back Reflection (DBR) laser; a distributed feedback (DFB) laser; a super structure grating distributed back reflection (SSG-DBR) laser; and a grating assisted coupler with sampled rear reflector (GSCR) laser.

7. The integrated optical transmitter of claim 1 wherein said optical beam has a wavelength that is a function of optical beam generator temperature and said optical transmitter and said modulator are compliantly mounted to a mounting surface and wherein said integrated optical transmitter further comprises a thermal control means for maintaining said integrated optical transmitter at a preselected temperature and a wavelength stabilization means that includes a means for sampling the optical beam for generating feedback signals indicative of the wavelength of the sampled optical beam and a controller receiving said feedback signals and for generating command signals for said thermal control means to adjust the temperature of the optical beam generator to provide an optical beam of a preselected wavelength and, wherein said wavelength stabilization means further comprises a beamsplitter for providing a split beam to an optical filter for reflecting and transmitting beams to a pair of optical detectors before presentation to respective optical detectors.

8. The integrated optical transmitter of claim 7, wherein said optical detectors are mounted with said optical filter.

9. The integrated optical transmitter of claim 1, wherein said optical beam generator is a semiconductor laser emanating said optical beam from a first facet thereof, and wherein said transmitter further includes:

an optical filter for receiving an optical beam of radiation from a second facet of said laser and reflecting a reflected beam and for transmitting a transmitted beam;

a pair of detectors, a first of said pair for receiving said reflected beam and a second thereof for receiving said transmitted beam, said detectors for producing first and second detected signals, respectively;

a thermal control element in thermal communication with said laser for controlling the temperature of said laser; and a controller responsive to said detectors for controlling the thermal control element and hence the temperature of laser for controlling the wavelength thereof responsive to said detected signals received from said detectors.

10. The integrated optical transmitter of claim 9, wherein said thermal control element includes a thermo electric cooler.

11. The integrated optical transmitter of claim 9, wherein said optical head assembly and said modulator are compliantly mounted to a mounting surface, and wherein said interface optics includes a focusing lens rigidly secured to said modulator.

12. The integrated optical transmitter of claim 11, wherein said focusing lens is rigidly secured to said optical head assembly.

13. The integrated optical transmitter of claim 9, wherein said optical head assembly is rigidly mounted to a mounting surface and wherein said modulator is compliantly mounted to said mounting surface, and herein said interface optics includes a focusing lens rigidly secured to said modulator.

14. The integrated optical transmitter of claim 9, wherein said optical filter includes a wedge shaped substrate having a filter deposited thereon.

15. The integrated optical transmitter of claim 14, wherein said pair of detectors is mounted to said optical filter.

16. The integrated optical transmitter of claim 15, wherein said optical head assembly include a mounting plate to which said laser and said optical filter is secured, and wherein said thermal control element includes a thermoelectric cooler in thermal communication with said mounting plate.

17. The integrated optical transmitter of claim 9, wherein said laser is a tunable semiconductor laser tunable over a wavelength range of approximately 60 nm, said wavelength range including a wavelength of 1550 nm.

18. The integrated optical transmitter of claim 1, wherein said optical beam generator is a semiconductor laser emanating said optical beam from a first facet thereof, and wherein said transmitter further includes:

an optical filter for receiving an optical beam of radiation from a second facet of said laser and reflecting a reflected beam and for transmitting a transmitted beam;

a pair of detectors, a first of said pair for receiving said reflected beam and a second thereof for receiving said transmitted beam for producing first and second detected signals, respectively; and a controller for controlling the current supplied to said laser for controlling the wavelength thereof responsive to a feedback signal determined in response to detected signals received from said detectors.

19. The integrated optical transmitter of claim 18, wherein said thermal control element includes a thermo electric cooler.

20. The integrated optical transmitter of claim 18, wherein said optical head assembly and said modulator are compliantly mounted to a mounting surface, and wherein said interface optics includes a focusing lens rigidly secured to said modulator.

21. The integrated optical transmitter of claim 18, wherein said focusing lens is rigidly secured to said optical head assembly.

22. The integrated optical transmitter of claim 18, wherein said optical head assembly is rigidly mounted to a mounting surface and wherein said modulator is compliantly mounted to said mounting surface, and herein said interface optics includes a focusing lens rigidly secured to said modulator.

23. The integrated optical transmitter of claim 18, wherein said optical filter includes a wedge shaped substrate having a filter layer deposited thereon.

24. The integrated optical transmitter of claim 23, wherein said pair of detectors is mounted to said optical filter.

25. The integrated optical transmitter of claim 24, wherein said optical head assembly includes a mounting plate to which said laser and said optical filter are secured, and wherein said thermal control element includes a thermo electric cooler in thermal communication with said mounting plate.

26. The integrated optical transmitter of claim 18, wherein said laser is a tunable semiconductor laser tunable over a wavelength range of approximately 60 nm, said wavelength range including a wavelength of 1550 nm.

27. A method of controlling the wavelength of light radiated by a semiconductor laser of an optical transmitter, comprising the steps of providing an optical filter for receiving a light beam from a facet of the laser such that the optical filter reflects a first beam and transmits a second beam;

detecting the first beam and second beams providing first and second detected signals, respectively;

comparing the first and second detected signals for generating a feedback signal responsive to the wavelength of the laser for controlling one of the current supplied to the laser and the temperature of the laser responsive to the feedback signal for controlling the wavelength of the light emanated by the laser.

28. The method of claim 27 wherein the step of providing the optical filter includes the step of providing a thermal conductor in thermal communication with the optical filter and with the laser.

29. The method of claim 27 wherein the step of detecting providing first and second detectors and mounting the first and second detectors to the optical filter.

* * * * *